(12) United States Patent
Yoshikawa

(10) Patent No.: US 9,566,829 B2
(45) Date of Patent: Feb. 14, 2017

(54) PNEUMATIC TIRE

(71) Applicant: BRIDGESTONE CORPORATION, Chuo-ku, Tokyo (JP)

(72) Inventor: Toshihiko Yoshikawa, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 168 days.

(21) Appl. No.: 14/375,712

(22) PCT Filed: Jan. 29, 2013

(86) PCT No.: PCT/JP2013/000444
§ 371 (c)(1),
(2) Date: Jul. 30, 2014

(87) PCT Pub. No.: WO2013/114852
PCT Pub. Date: Aug. 8, 2013

(65) Prior Publication Data
US 2015/0013865 A1    Jan. 15, 2015

(30) Foreign Application Priority Data

Feb. 1, 2012   (JP) ................................ 2012-020137
May 24, 2012   (JP) ................................ 2012-118974
May 24, 2012   (JP) ................................ 2012-118984

(51) Int. Cl.
B60C 11/12    (2006.01)
B60C 11/11    (2006.01)

(52) U.S. Cl.
CPC ............ B60C 11/1218 (2013.04); B60C 11/11 (2013.01); B60C 11/1236 (2013.04);
(Continued)

(58) Field of Classification Search
CPC .. B60C 11/12; B60C 11/1218; B60C 11/1236; B60C 11/1204; B60C 2011/1209; B60C 2011/1213; B60C 11/1222; B60C 2011/1227; B60C 11/124; B60C 2011/129; B60C 2011/1295
(Continued)

(56) References Cited

U.S. PATENT DOCUMENTS 6,427,737 B1   8/2002 Katayama
7,201,195 B2 * 4/2007 Metzger .................. B60C 11/12
                                                152/209.21
(Continued)

FOREIGN PATENT DOCUMENTS

CN   1274521 C    9/2006
CN   100411893 C  8/2008
(Continued)

OTHER PUBLICATIONS

Communication dated Aug. 4, 2015 from the Japanese Patent Office in counterpart application No. 2012-020137.
(Continued)

*Primary Examiner* — Eric Hug
(74) *Attorney, Agent, or Firm* — Sughrue Mion, PLLC

(57) ABSTRACT

A pneumatic tire comprising one or more sipes having a depth (D) and, as seen in a widthwise section of the sipe, a perpendicular portion and a bend portion. The bend portion has, a first sub-bend point in a depth region of D/2-D/7, a main-bend point in a depth region of D/4-3D/4, and a second sub-bend point a depth region of D/2-6D/7, forming first and second inclined sections between the bend points. Each of the first and second inclined sections forms acute angles ($\theta_1$, $\theta_2$) of $30° \leq \theta_1 \leq 60°$ and $30° \leq \theta_2 \leq 60°$, relative to a tangent of tread surface. The first inclined section has an area (a1) and the second inclined section has an area (a2), and ratios (a1/A and a2/A) of the area (a1) and (a2) to an orthographic projection area (A) of the sipe are not less than 0.1.

18 Claims, 7 Drawing Sheets

(52) U.S. Cl.
CPC . *B60C 2011/1209* (2013.04); *B60C 2011/129* (2013.04); *B60C 2011/1295* (2013.04)

(58) Field of Classification Search
USPC ............................ 152/209.18, 209.8, 209.16
See application file for complete search history.

(56) References Cited

U.S. PATENT DOCUMENTS

| | | | |
|---|---|---|---|
| 2003/0029537 A1 | 2/2003 | Iwamura | |
| 2005/0211354 A1* | 9/2005 | Shinmura et al. | |
| 2006/0169377 A1* | 8/2006 | Hashimoto | B60C 11/12 152/209.23 |
| 2009/0223613 A1* | 9/2009 | Saeki | B29D 30/0606 152/209.18 |
| 2010/0206447 A1 | 8/2010 | Ohashi et al. | |
| 2010/0212794 A1* | 8/2010 | Watabe | B60C 11/11 152/209.18 |
| 2011/0048602 A1* | 3/2011 | Hayashi | B60C 11/11 152/209.18 |
| 2012/0180920 A1* | 7/2012 | Nagayasu | B60C 11/1218 152/209.21 |

FOREIGN PATENT DOCUMENTS

| | | | |
|---|---|---|---|
| CN | 101784401 A | | 7/2010 |
| EP | 0952011 A2 | | 10/1999 |
| JP | 63-275406 A | | 11/1988 |
| JP | 3-35803 U1 | | 4/1991 |
| JP | 6-143942 | * | 5/1994 |
| JP | 10-166816 A | | 6/1998 |
| JP | 11-170817 A | | 6/1999 |
| JP | 2000-006618 A | | 1/2000 |
| JP | 2000-255219 A | | 9/2000 |
| JP | 2003-025812 A | | 1/2003 |
| JP | 2005-271792 A | | 10/2005 |
| JP | 2005-297845 A | | 10/2005 |
| JP | 2006-341816 | * | 12/2006 |
| JP | 2006-341816 A | | 12/2006 |
| JP | 2007-186053 | * | 7/2007 |
| JP | 2008-037113 A | | 2/2008 |
| JP | 2008087648 A | | 4/2008 |
| JP | 2010-6107 A | | 1/2010 |
| JP | 2010-188922 A | | 9/2010 |
| WO | 2009/005056 A1 | | 1/2009 |

OTHER PUBLICATIONS

International Search Report for PCT/JP2013/000444 dated Apr. 16, 2013.
Communication dated Nov. 10, 2015 from the Japanese Patent Office issued in corresponding Application No. 2012-118974.
Communication dated Nov. 10, 2015 from the Japanese Patent Office issued in corresponding Application No. 2012-118984.
Communication dated Oct. 16, 2015 from the Russian Patent Office in counterpart application No. 2014135390/11.
Communication dated Aug. 17, 2015 from the European Patent Office issued in corresponding application No. 13744301.6.

* cited by examiner

PNEUMATIC TIRE

CROSS REFERENCE TO RELATED APPLICATIONS

This application is a National Stage of International Application No. PCT/JP2013/000444 filed Jan. 29, 2013, claiming priority based on Japanese Patent Application Nos. 2012-020137, filed Feb. 1, 2012; 2012-118974, filed May 24, 2012 and 2012-118984, filed May 24, 2012, the contents of all of which are incorporated herein by reference in their entirety.

TECHNICAL FIELD

This invention relates to a pneumatic tire having a plurality of land portions in a tread, and one or more sipes are provided in the land portion.

BACKGROUND ART

Conventionally, it has been attempted to increase edge components of the tread surface by means of providing plural of sipes in the land portion of the tread surface so as to realize excellent driving performance on icy-snowy road.

The provision of more sipes in the tread surface may increase the edge components thereof, however on the other hand, it deteriorates the rigidity of the land portion of the tread. In this case, the land portion is leaned and deformed by being loaded when the vehicle is braking, driving, or turning, and it caused a problem that the contact area of the tire and road surface is reduced and then the grounding property is deteriorated.

Patent Document 1 discloses a pneumatic tire comprising sipes which extends in a zigzag manner, having a bend portion with plural of bent points, from the side of the tread surface to the radially inward, to suppress the deformation of the land portion caused by the leaning of the land portion and maintain the grounding property of the tread surface.

However, when it comes to applying the sipes described in the patent document 1 to the tire for all seasons, which may be used not only on icy-snowy road but also on dry road and having large frictional coefficient and input a large force to the tread surface, there are cases especially as getting input on dry road that the edge of sipes are get involved between the tread surface and end up to be lacked.

Patent Document 2, in contrast, proposes to provide sipes having a perpendicular portion which extends to the normal direction from the tread surface S of the land portion, and a bend portion, being formed radially inward of the perpendicular portion and extends toward the bottom of the land portion while bending in the longitudinal direction of the tangent to the tread surface S. According to such configuration, it is possible, at the bend portion of the sipe, to suppress the deformation and leaning of the land portion, and at the perpendicular portion of the sipe, to prevent the lack of sipe edges.

CITATION LIST

Patent Literatures

Patent Document 1: JP H11-170817 A
Patent Document 2: JP 2006-341816 A

SUMMARY OF INVENTION

Technical Problem

In recent years, the improvement of driving performance both on icy-snowy road and on dry road in an higher level has been strongly desired. From this point of view, a room for the further improvement has still been left for the shape of sipes provided in the land portions of a tire.

Hence, it is an object of the present invention to provide a pneumatic tire with land portions each having one or more sipes, wherein the deformation of the land portions caused by the leaning of the land portion is sufficiently suppressed and the grounding properties are increased while the lack of sipe edges are suppressed, so that to realize an improved braking and driving performance both on icy-snowy road and on dry road.

Solution to Problem

The inventor conducted thorough investigations seeking for solution of the above-mentioned problem. As a result, it has been found that the mutual supporting effect would be distributed, in the shape of sipe described in Patent Document 2. The reason is that the position in the sipe depth direction, at which is to support the leaning of the land portion when the tire is rolling, differs depends on the direction of input from the tread surface to the land portion.

That is, in the shape of the sipe described in Patent Document 2, when the land portion receives input by the ground counterforce from the tread surface in the direction toward the right side from the left side of the drawing shown in FIG. 7, the walls mutually facing across the sipe come into contact with each other at the bend portion 100 of the central part of depth and support the land portion of the left side, in the drawing, so as not to lean. On the other hand, when the land portion receives input by the ground reaction force from the tread surface in the direction toward the left side from the right side of the drawing, the walls of mutually facing across the sipe come into contact with each other at the bend portions 101 and 102 and support the land portion of the right side, in the drawing, so as not to lean. In this manner, the positions at which support the land portion so that not to lean vary over, in the sipe depth direction, depends on the input direction from the road surface. Especially, in the illustrated example, in the case of the supporting position locates at both of the bend portion 101 and 102; the supporting position is distributed in the direction of the sipe depth when the land portion receives input in the direction toward the left side from the right side of the drawing.

Therefore, the inventor continued further studies based on the idea that it must be possible to prevent the leaning of the land portion more effectively if the distribution in the direction of the sipe depth of mutual supporting effect can be avoided. As a result of that, inventor has been found that the mutual support at the same position in the sipe depth regardless of the input direction may be realized by bending a sipe at the center region of the sipe depth and providing relatively large two inclined surfaces there. The inventor further found that the leaning of the land portion may be effectively suppressed and the cornering performance as braking, driving, or turning may be significantly increased by concentrating the supporting position at the central region of the sipe depth. Such findings resulted in completion of the present invention.

That is, the summary of the present invention is as follows;

(1) A pneumatic tire including a tread with land portions each having one or more sipes, characterized in that:

the sipe has a depth (D) and comprises, as seen in a widthwise section of the sipe and in a depth direction from the tread surface (S), a perpendicular portion extending along a normal line of the tread surface at a center of an opening of the sipe, and a bend portion bending across the perpendicular portion toward one side and then toward the other;

the bend portion comprises, in an order in the depth direction, a first sub-bend point in a depth region of D/2-D/7, a main-bend point in a depth region of D/4-3D/4, and a second sub-bend point in a depth region of D/2-6D/7, wherein a first inclined section is formed between the first sub-bend point and the main-bend point, and a second inclined section is formed between the main-bend point and the second sub-bend point; and the first inclined section forms an acute angle θ1 with relative to a tangent at an opening end of the sipe in the tread surface, wherein the acute angle θ1 of the first inclined section is 30°≤θ1≤60°, and the second inclined section forms an acute angle θ2 relative to said tangent, wherein the acute angle θ2 of the second inclined section is 30°≤θ2≤60°. (First Aspect)

(2) A pneumatic tire including a tread with land portions each having one or more sipes, characterized in that:

the sipe has a depth (D) and comprises, as seen in a widthwise section of the sipe and in a depth direction from the tread surface (S), a perpendicular portion extending along a normal line of the tread surface at a center of an opening of the sipe, and a bend portion bending across the perpendicular portion toward one side and then toward the other;

the bend portion comprises, in an order in the depth direction, a first sub bend point in a depth region of D/2-D/7, a main bend point in a depth region of D/4-3D/4, and a second sub bend point in a depth region of D/2-6D/7, forming a first inclined section between the first sub bend point and the main bend point, and a second inclined section between the main bend point and the second sub-bend point; and the first inclined section has an area a1 measured in a longitudinal direction of the sipe and a ratio a1/A of the area a1 to the projected area A of the sipe in an orthogonal projection in the width direction of the sipe, and the second inclined section has an area a2 measured in the longitudinal direction of the sipe and a ratio a2/A of the area a2 to said projected area A of the sipe, wherein the ratios a1/A, a2/A of the first and second inclined sections are both not less than 0.1. (Second Aspect)

The tire according to the present invention makes it possible to suppress the leaning of the land portion since the concave and convex portions facing each other across the sipe are engaged when the tire is rolling. Further, the degree of suppression of the leaning of the land portions can be at the same level without depending on the input direction to the tread surface since two inclined surfaces are formed over an appropriate area in the central region of the sipe depth and each of them supports the leaning of the land portion. Moreover the effect of suppressing the leaning of the land portion is significantly improved since the land portion is supported in the central region of the sipe depth.

On the other hand, the perpendicular portion may prevent the retraction of the tread surface of the land portion when the tire is grounding so as to avoiding the loss of the edge of the sipes.

Here, the term "perpendicular portion which extends along a normal line of the tread surface obtained at a center of an opening of the sipe" is not necessary to be strictly perpendicular to the tread surface in mathematical sense, and rather, it is sufficient to extends in the normal direction to the extent that the retraction of the tread surface of the land portion may be suppressed and the lack of the sipe edges may be avoided. Therefore, the angle between the extending direction of the perpendicular portion and the tread surface may be, for example, not less than 80° and not more than 90° as measured from an acute angle side.

The term "width direction of the sipe" means the direction of the opening width of the sipe (sipe width) having 0.1 mm to 1.0 mm along the longitudinal direction of the sipe.

(3) The pneumatic tire according to above (2), wherein both of said ratios (a1/A, a2/A) are not more than 0.5.

In this way, it is possible to exert a sufficient effect of the present invention by setting an upper limit of the above ratio (a1/A) and (a2/A) so as to maintaining the area of the first inclined portion and the second inclined portion in an appropriate range.

(4) The pneumatic tire according to above (1) or (2), wherein the first inclined section extends in the tangential direction of the tread surface over a distance $W_1$, which is $0<W_1 \leq D/3$, and the second inclined section extends in the tangential direction of the tread surface over a distance $W_2$, which is $0<W_2 \leq D/3$.

According to this structure, it is possible to suppress the leaning of the land portion more efficiently since the each land portion facing each other across the sipe may engaged more effectively.

(5) The pneumatic tire according to above (1) or (2), wherein two or more of said sipes are provided in the land portion of the tread so that the shortest distance between adjacent sipes in the direction perpendicular to the longitudinal direction of the sipe is not less than D.

According to this structure, it is advantageous in improving the driving performance and braking performance not only on snowy-icy road surface, but also on dry road surface.

(6) The pneumatic tire according to above (1) or (2), wherein the perpendicular section has a length in the normal direction of the tread surface, said length being not less than (D/7).

According to this structure, it is possible in the sipe to secure the enough area of the bend portion which suppress the leaning of the land portion, at the same time of having the perpendicular portion for preventing the retraction of the tread surface of the land portion.

(7) The pneumatic tire according to above (1) or (2), wherein the longitudinal direction of the sipe is consistent with the tire width direction.

According to this structure, it is possible to exert the above function by the perpendicular portion and the bend portion of the sipe more effectively.

(8) The pneumatic tire according to above (1) or (2), wherein the sipes have a sipe density (TL/R) which indicates a ratio of the total value (TL) of the longitudinal length of all the sipes in the tread surface to the total area (R) of the land portion of the tread, said sipe ratio being not more than 0.1/mm.

Generally, when the tread surface of the land portion is subjected to ground reaction force from the road surface as the tire is rolling, the walls of the land portion tends to be expanded and deformed. As a result, the adjacent land portions come into contact with each other, especially when the sipe density in the land portion is relatively small. Therefore, according to this structure, it is possible to exert the effect of suppressing the deformation and leaning of the land portions more effectively by providing the sipe shape characteristic of the present invention to the land portion which h has small density of sipes as mentioned above.

(9) The pneumatic tire according to above (1) or (2), wherein the tread comprises a center region defined between a ½ point of the tread which is a midpoint between the tread ends, and ¼ points of the tread which are midpoint between the ½ point and the tread ends, and shoulder regions defined between the ¼ points and the tread ends, wherein the center region has a sipe density (TLC/RC), which is a ratio of the total value (TLC) of the longitudinal length of all the sipes in the tread surface in the center region to the total area (RC) of the land portion of the tread, said sipe density in the center region being not more than 0.25/mm, and wherein each of the shoulder regions have a sipe density (TLS/RS), which is ratio of total value (TLC) of the longitudinal length of all the sipes in the tread surface of a shoulder region to the total area (RC) of the land portion of the tread, said sipe density in the shoulder regions being not more than 0.2/mm.

Generally, the density of sipe in a center region of the tread is larger than that in a shoulder region of the tread, therefore, it is possible to exert the effect of the present invention more by defining the sipe density of each region.

(10) The pneumatic tire according to above (1) or (2), wherein the sipe comprises a bend region, in which the bend portion is continuous in the longitudinal direction of the sipe, and a plate-like area on either side or both sides of the bend region, in which the perpendicular region is continuous in the longitudinal direction of the sipe.

The plate-like area comprises the sipe straightly extends without bending, therefore the scratching effect by the edge portion exposed to the tread surface may be expected on icy-snowy road surface. For this reason, the structure having the plate-like area on both sides or either side of the longitudinal end portion of the sipe may improve braking performance and driving performance not only on dry road surface bur also on icy-snowy road surface. Further, it is also possible to facilitate the formation of sipes in the vulcanizing process of the tire by providing the plate-like area at the longitudinal end portion of the sipe.

(11) The pneumatic tire according to above (10), wherein the plate-like region has a length in the longitudinal direction, said length being not less than 1% and not more than 95% of the length of the sipe in the longitudinal direction.

If the ratio is set in the above range, it is possible, by allowing moderate leaning of the land portion in the plate-like area, to sufficiently obtain the scratching effect of the edge portion of the tread surface while suppressing the leaning of the land portion in the bend area. Therefore, the excess leaning of the land portion in the entire tread may be avoided. In this way, it is possible to achieve the high-leveled driving and braking performance on both icy-snowy road surface and dry road surface, by improving ice and snow performance at the longitudinal end portion of the sipe and simultaneously improving dry performance at the center portion of the sipe which may suppress the leaning of the land portion.

Advantageous Effect of Invention

According to the present invention, it is possible, in tires include a tread with land portions each having one or more sipes, to well improve braking and driving performance on both icy-snowy road and dry road. This is due to suppressing the leaning deformation of the land portion and improving the grounding property of the land portion while suppressing the lack of the sipe edge.

DESCRIPTION OF EMBODIMENTS

Now, explanation will be made of the pneumatic tire according to the present invention with reference to the drawings in order from the first aspect.

Figure 1:
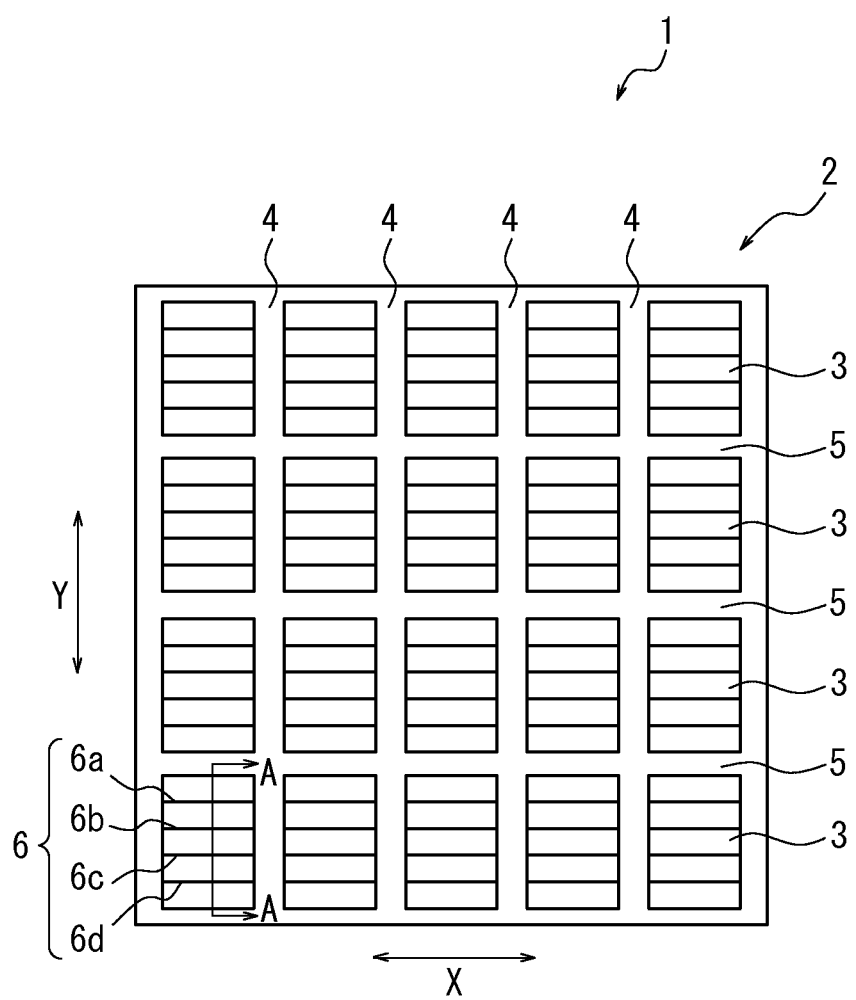
FIG. 1 is an exploded view partially showing the tread of a pneumatic tire according to an embodiment of the present invention.

FIG. 1 shows the partial exploded view of the tread 2 of the pneumatic tire 1 (also referred to as a tire below) according to the first aspect of the present invention.

This tire 1 includes a pair of sidewalls, a carcass consisting of plies of steel cords or organic fiber cords and extending through the crown portion of the tread from the one side to the other side of the sidewalls, and a belt made of steel cord layer disposed between the tread and the carcass.

The tread 2 comprises the land portion 3 of the rib-liked, block-liked, or lug-liked. In the example of FIG. 1, plural of land portions 3 in a block shape are defined by forming circumferential grooves 4 extending in a tire circumferential direction (Y-direction in FIG. 1) and plural of lateral grooves 5 extending in the tire width direction (X-direction in FIG. 2) intersects with the circumferential grooves 4.

In the illustrated embodiment of FIG. 1, there is shown the block-liked land portions 3, which are defined by the lateral grooves 5 and the circumferential grooves 4, however, the land portions may be a rib-liked portion which defined by only the circumferential grooves 4. Further, the land portions 3 may be lug-shaped land portions which are formed only by the lateral grooves and are continuous in the tire width direction. Moreover, the circumferential groove 4 extends in straight, however, it may be nonlinear shaped as zigzag-shaped, serrated-shaped, or wavy-shaped.

Furthermore, the lateral groove 5, in the illustrated example, extends completely parallel to the tire width direction, that is, extends to the direction perpendicular to the circumferential direction of the tire. However, the lateral groove 5 may also extend at an angle with respect to the tire width direction and be nonlinear as in zigzag, serrated, or wavy shaped.

In the each land portions 3, one or more sipes 6, in this case the four sipes 6a-6d extending to the tire width direction (X-direction), are provided in a manner that the sipes cross the land portion 3 from the one circumferential grooves 4 to the other circumferential grooves 4 and are formed along the circumferential direction (Y-direction) of the tire with predetermined intervals.

Here, the sipes 6 referred to in the present invention defined as a cut having opening width of 0.1-1.0 mm, in which at least one part of the walls forming the sipe are mutually touches (closed) when the land portion 3 is grounding.

Further, in the FIG. 1, the length in the tire width direction of sipe 6 and that of the land portion 3 is same, thus the land portion 3 is disposed so as to be divided in the circumferential direction by the sipe 6. However, the length in the tire width direction of sipe 6 may be shorter than that of the land portion 3. In this case, the one end of sipe opens to the circumferential grooves and the other end of sipe stops in the land portion, or both ends stop in the land portion.

Figure 2:
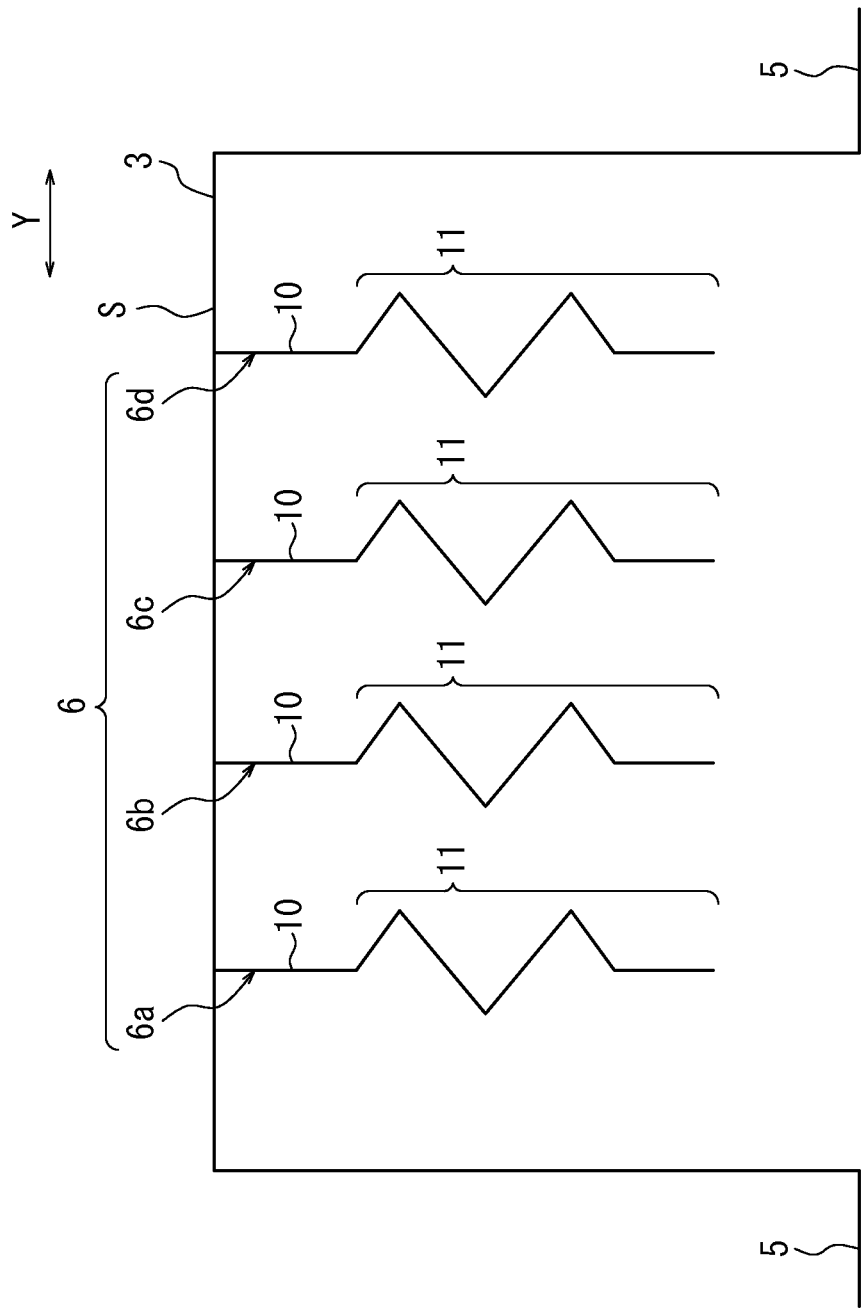
FIG. 2 is a sectional view when the land portion described in FIG. 1 is cut in the width direction of the sipe.

FIG. 2 is a sectional view when the land portion 3 described in FIG. 1 is cut in the width direction of the sipe 6. That is, FIG. 2 is a sectional view along the line A-A of the sipe 6 described in FIG. 1.

The sipe 6 has a perpendicular portion 10 which extends along a normal line of the tread surface obtained at a center of an opening of the sipe and a bend portion which bends toward one side and then toward the other in the width direction of the sipe across the normal line, and the sipe 6 is continuously formed in the radial direction to the bottom of the land portion 3 so as to divide the land portion 3 in the tire circumferential direction. The bend portion 11 is formed as being folded several times, with respect to the perpendicular portion 10, to the front-back direction of the tire circumferential direction. When explained as for the illustrated example, the bend portion 11 is formed as being folded several times to be inclined in the lateral direction.

Figure 3:
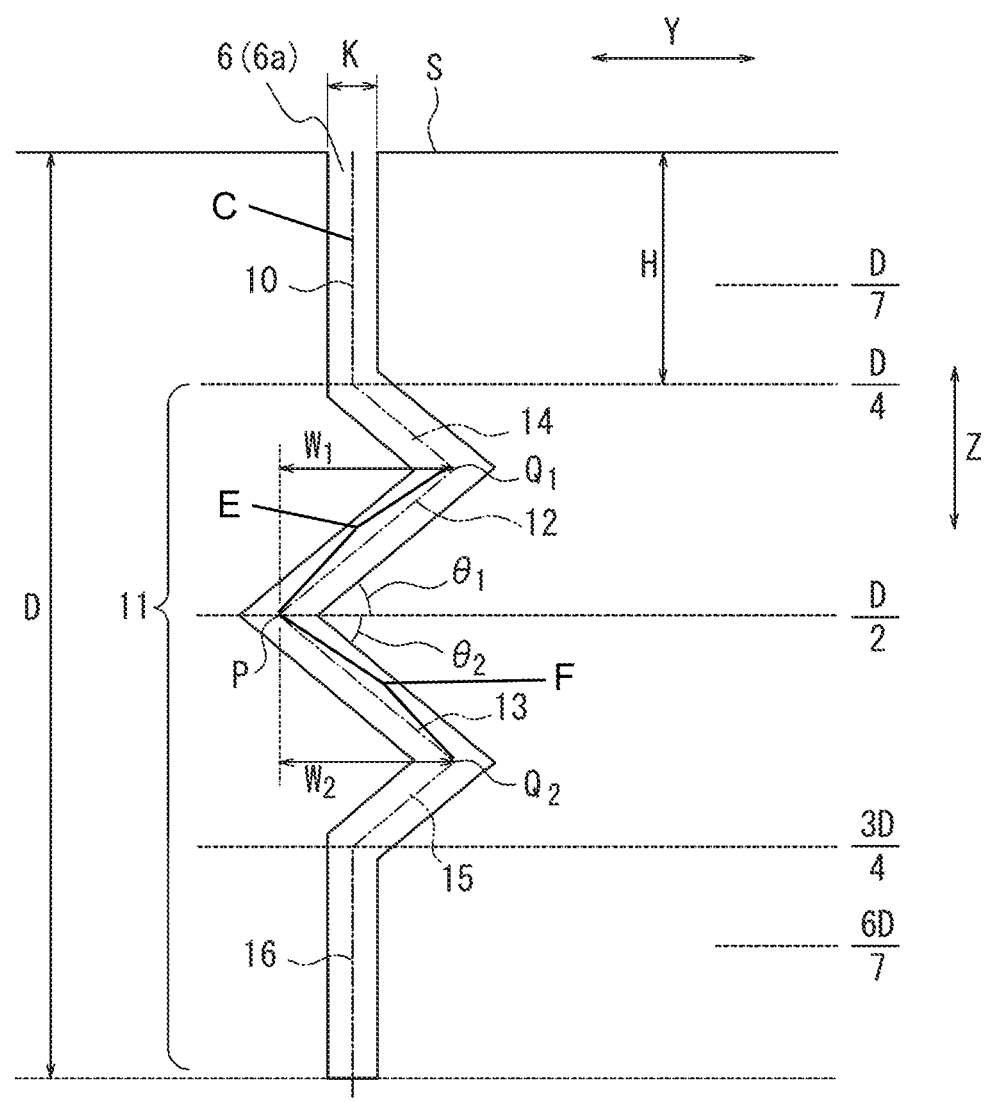
FIG. 3 is an enlarged view of one of the sipes describes in FIG. 2.

Next, FIG. 3 shows an enlarged view of one of the sipes 6a through 6d describes in FIG. 2. Here explained, with reference to the FIG. 3, the structure of the bend portion 11 of the sipe 6 which characterize the present invention and the perpendicular portion 10 of the sipe 6.

Further, the size of each sipe 6 explained below is defined by the central line C (dashed line) in the width direction of the sipe 6. Moreover, the "point" or "portion" on the sectional view of FIG. 3 in the following description is, in fact, intended to form a "line" or "plane" respectively. Therefore, the sipe 6 is explained as having three-dimension structure formed by extending in the longitudinal direction of the cross-sectional shape of the sipe width.

In the first aspect of the present invention, when the depth of sipe from the tread surface is defined as D, it is important that the bend portion 11, in the section of the tire width direction, has in order along the depth direction of the sipe a first sub-bend point ($Q_1$) in a depth region of D/7-D/2, a main-bend point (P) in a depth region of D/4-3D/4, and a second sub-bend point ($Q_2$) in a depth region of D/2-6D/7, forming a first inclined section between the first sub-bend point ($Q_1$) and the main-bend point (P) and a second inclined section between the main-bend point (P) and the second sub-bend point ($Q_2$).

Further, it is also important that each of the first inclined section and the second inclined section forms an acute angle $\theta 1$ and $\theta 2$ with respect to the tangent line of the tread surface obtained at an opening edge of the sipe, and the angle $\theta 1$ and $\theta 2$ is $30°\leq \theta 1\leq 60°$, $30°\leq \theta 2\leq 60°$.

Specifically, the sipe 6a shown in FIG. 3 has the perpendicular portion 10 extending, in a depth region from the tread surface S to D/4, straight along the normal direction (Z-direction in FIG. 3) from the tread surface S toward the bottom of the land portion. The sipe 6a opens to the tread surface S at the end of the perpendicular portion 10.

Then, in a depth region of D/4-D/3, the inclined section 14 inclined toward the one side of the normal direction of the tread surface S, in this case toward the lower right on this paper, is formed following the perpendicular portion 10. Then, in a depth region of D/3-D/2, the first inclined section 12 inclined toward the other side of the normal direction of the tread surface S, in this case toward the lower left on this paper, is formed through the first sub bend point $Q_1$ at the depth of D/3. Then further, in a depth region of D/2-2D/3, the second inclined section 13 inclined toward the one side of the normal direction of the tread surface S, in this case toward the lower right on this paper, is formed through the main bend point P at the depth of D/2. Then furthermore, in a depth region of 2D/3-3D/4, the inclined section 15 inclined toward the other side of the normal direction of the tread surface S, in this case toward the lower left on this paper, is formed through the second sub bend point $Q_2$ at the depth of 2D/3. Moreover, the portion 16 extending straight along normal direction (Z-direction) toward the bottom of the land portion is formed.

As mentioned above, the term "sipe width direction" means the direction of the opening width (sipe width K) of the sipe which is 0.1 to 1.0 mm, and the opening width of sipe is approximately constant through the sipe depth D from the tread surface S.

In this way, the sipe 6 having a shape bending in the tangential direction of the tread surface S through the main-bend point P, the first sub-bend point $Q_1$ and the second sub-bend point $Q_2$, and therefore, it is possible to suppress the leaning of the land portion because the wall surfaces, separated by the sipe 6, faces each other are to mutually contact when the tire is rolling.

In the present invention, the sipe 6 has relatively large two surfaces in the central region of the depth D of the sipe 6, the first inclined section 12 and the second inclined section 13, formed through the three bend point mentioned above, and the leaning of the land portion may be suppressed by strongly contacted the walls separated by the sipe 6.

That is, with reference to the FIG. 3, the wall surfaces separated by the sipe 6 at the first inclined section 12 are to be strongly contacted each other when the land portion received input from the road surface in the direction from left to right side of the paper. In this case, the leaning of the land portion may be suppressed because the land portion located on the input side of the road surface, the left side in FIG. 3, is to be supported by the frictional force between the wall surfaces. On the other hand, the wall surfaces separated by the sipe 6 at the second inclined section 13 are to be strongly contacted each other when the land portion received input from the road surface in the direction from right to left side of the paper. In this case, the leaning of the land portion may be suppressed because the land portion located on the input side of the road surface, the right side in FIG. 3, is to be supported by the frictional force between the wall surfaces.

In this way, the sipe 6 has relatively large two surfaces in a depth region of D/7-6D/7, a central region of the sipe depth, which are formed by being folded at the main-bend point P which locates in a depth region of D/4-3D/4. The leaning of the land portion by input from two directions is supported by each inclined sections. Therefore, it is possible to support the leaning of the land portion at the central region of the sipe depth regardless of the input direction, and also to make the degree of inhibition of the leaning deformation to be at the same level. In other words, it is possible to suppress the leaning of the land portion regardless of the direction of the tire rotation. In addition, the supporting positions never being dispersed in the depth direction as conventional tire, in which the supporting position changes depends on the input direction. As a result of that, the effect to suppress the leaning of land portion may be remarkably improved, also the grounding property may be increased by assuring the rigidity of land portion, and driving and braking performance of entire tire may be enhanced.

Further, the first inclined section and the second inclined section each forms an acute angle θ1 and θ2 with respect to the tangent line of the tread surface obtained at an opening edge of the sipe, and the angle θ1 and θ2 is 30°≤θ2≤60° so as to exhibit the engagement effect between the walls of the land portions divided by the sipe, because. As a result, the frictional force at the contact area of the walls is increased, and the leaning of the land portion may be more effectively suppressed. Furthermore, if the angle is not less than 30°, it is advantageous for production of tires because the tire may be easily removed from a mold after vulcanization.

Moreover, the leaning of the land portions may be suppressed more effectively by providing not only the main-bend point P but also the first sub-bend point $Q_1$ and the second sub-bend point $Q_2$ and strongly contacting the walls at the first inclined section 12 and the second inclined section 13 as well.

As described above, it become possible to suppress the leaning of the land portion without depending on the input direction and improve the braking performance and driving performance of tire sufficiently for the first time when the sipes provided the main-bend point P in a depth region of D/4-3D/4, the first sub-bend point $Q_1$ in a depth region of D/7-D/2, the second sub-bend point $Q_2$ in a depth region of D/2-6D/7, and the angle θ1 and θ2 is within the range of 30°≤θ2≤60°.

Further, enough rigidity is assured around the tread surface S since the sipe 6 has the perpendicular portion 10. As a result of that, it is possible to prevent the edge of the sipe from being caught between the tread surface and the road surface during grounding. Therefore, it may be possible to prevent the lack of sipe edges not only on icy-snowy road surface but also on dry road surface.

Now, the second aspect will be described with reference to FIG. 4 or later. This second aspect has the basic structures explained with reference to FIG. 1 to FIG. 3.

Figure 4A:
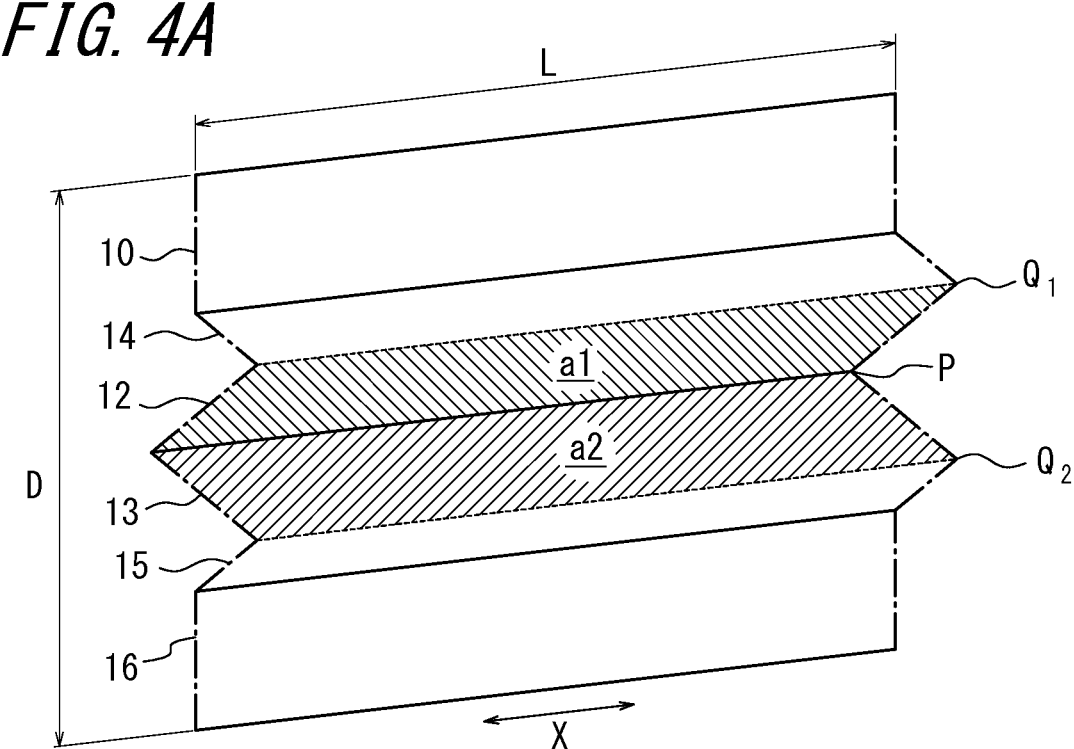
FIG. 4A is a drawing showing the shape of the sipe according to the present invention along the longitudinal direction of the sipe.

FIG. 4A is a drawing showing the shape of the sipe 6 (refer to FIG. 3) in a land portion of the tread along the longitudinal direction of the sipe. Generally, the term sipe means the space formed by being surrounded by wall surfaces of the tread land portion having a constant opening width, however, here in FIG. 4A, the shape of the sipe 6 is shown as a plane formed by the center line C of the sipe extending to the width direction. The solid lines indicate the valley portion of the sipe 6 and dashed lines indicate the peak portions of the sipe 6 when viewed the shape of the sipe 6 from the front of the drawing paper.

Figure 4B:
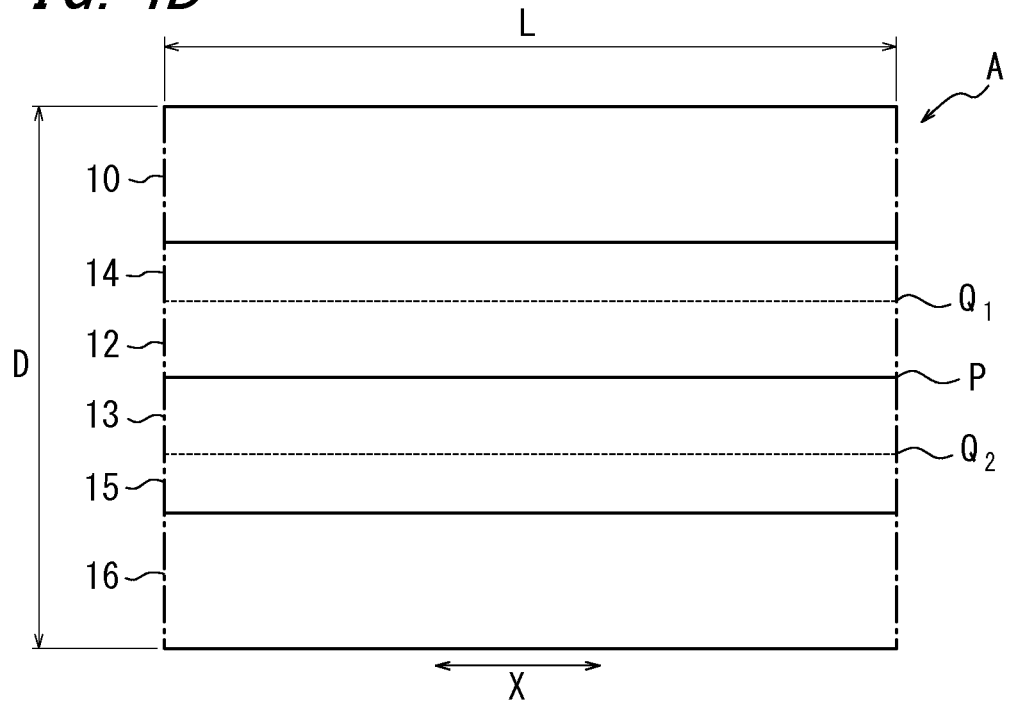
FIG. 4B is a projection surface positively projected from the width direction of the sipe described in FIG. 4A.

Here, the area of the first inclined section 12, that is the area determined by multiplying the length E of short side of the first inclined section 12 and the longitudinal length L of the first inclined section 12 is named as a1, similarly, the area of the second inclined section 13, that is the area determined by multiplying the length F of short side of the second inclined section 13 and the longitudinal length L of the second inclined section 13 is named as a2. Further, FIG. 4B is a projection surface, of the sipe described in FIG. 4A, positively projected from the width direction. The area determined by multiplying the depth D of the sipe and the longitudinal length L of the sipe is named as projected area A of the sipe.

Now, it is important, in the tire according to the second aspect of the present invention, that the ratio (a1/A) of the area (a1) of the first inclined section 12 to the projected area (A) of the sipe, and the ratio (a2/A) of the area (a2) to the second inclined section 13 to the projected area (A) of the sipe, wherein the ratio of (a1/A and a2/A) are not less than 0.1.

The ratio (a1/A) of the area (a1) of the first inclined section 12 and the projected area (A) of the sipe, and the ratio (a2/A) of the second inclined section 13 and the projected area (A) of the sipe being set to 0.1 or more, so that to ensure the two inclined sections of sufficient area. According to this configuration, the deformation and leaning of the land portion may be sufficiently suppressed by the increased frictional force obtained when the walls of the inclined area contacts each other.

In this way, it become possible for the first time to suppress the leaning of the land portion without depending on the input direction and improve the braking performance and driving performance of tire sufficiently when the sipes being provided with the main-bend point P in a depth region of D/4-3D/4, the first sub-bend point $Q_1$ in a depth region of D/7-D/2, the second-sub bend point $Q_2$ in a depth region of D/2-6D/7, and the ratio (a1/A), of the area (a1) of the first inclined section 12 and the projected area (A) of the sipe, and the ratio (a2/A), of the second inclined section 13 and the projected area (A) of the sipe is not less than 0.1, The effect of the present invention may be enhanced when the ratio (a1/A), of the area (a1) of the first inclined section 12 and the projected area (A) of the sipe, and the ratio (a2/A), of the second inclined section 13 and the projected area (A) of the sipe is not more than 0.5.

Further, it is preferable, for the sipe 6 of the first aspect and the second aspect, that the distance ($W_1$) in the tangential direction of the tread surface of the first inclined section is 0<$W_1$≤D/3 and the distance ($W_2$) in the tangential direction of the tread surface of the second section is 0<$W_2$≤D/3.

The reason why the distance 0<$W_1$ and 0<$W_2$ is because the first inclined section 12 and the second inclined section 13, in which the walls faces each other across the sipe are contacting each other, are formed so as to be able to suppress the deformation and leaning of the land portion as previously described.

Further, the reason why the distance $W_1$ and $W_2$ is not more than D/3 is that it may makes it easy to remove tire from the tire mold after vulcanization so as to be advantageous for manufacturing.

Moreover, the effect of the present invention is well exhibited especially when provided an arrangement interval of sipes, which is the shortest distance between the adjacent sipes, of not less than D if two or more sipes 6 are provided for the land portion 3.

In this way, by arranging the sipes 6 with a certain interval or more, it is possible in the sipe to secure the enough area of the bend portion which suppress the leaning of the land portion, at the same time of having the perpendicular portion for preventing the retraction of the land portion of the tread. Further, by arranging the sipes 6 with a certain interval or more, it is also possible to prevent the reduction of rigidity of the tire surface caused by too small interval between sipes 6 so as to improve the driving performance and braking performance not only in a snowy and icy road surface, but also in a dry road surface.

On the other hand, it is preferable that the arrangement interval of sipes is not more than 10D, in order to suppress the reduction of edge component associated with the reduction of the interval of sipes.

Moreover, it is preferable that the length H of the perpendicular portion 10 along the normal direction of the tread surface S is not less than D/7.

When the length H of the perpendicular portion 10 along the normal direction is shorter than 1/7 of the sipe depth D, the rigidity around the sipe edge is insufficient and the possibility emerges that the sipe edge is leaned, deformed and lacked due to being caught by the road surface.

Furthermore, it is preferable that the longitudinal direction of sipe 6 corresponds to the tire width direction. That is, when the sipe 6 extends preferably in parallel with the tire width direction as the extended view of FIG. 1, it is possible to improve the driving and braking performance of tire while traveling straight. Further, the sipe may extend at an incline in the tire width direction. The driving performance and braking performance are good during straight running and turning.

Moreover, it is preferable that the sipe density TL/R, which indicates the ratio of total value TL of the longitudinal length of all the sipes provided in the tread surface S to the total area R of the land portion, is not more than 0.1/mm. Especially, the sipe density TL/R being the above range and not less than 0.0001/mm.

Generally, when the tread surface of the land portion is subjected to a ground reaction force from the road surface as the tire is rolling, the walls of the land portion tends to be expanded and deformed. As a result, the adjacent land portions come into contact with each other, especially when the sipe density in the land portion is relatively small. Therefore, the aforementioned effect in which the deformation and leaning of the land portions is in particular exerted when arranged sipes in a manner that the arrangement interval of sipe is not less than D, and the sipe density is not more than 0.1/mm.

That is, when disposing conventional sipes extending straight towards normal direction of the tread surface to the land portion where the interval of sipes in the tread surface is large or where the ratio of the sipes to the area of the tread surface S is small, it is difficult to avoid the deformation and leaning of walls of the land portion because the density of sipe in the land portion is still small. Thus, the sipes 6 according to the present invention effectively work under such conditions, because the sipes 6 may increase the sipe density in the inner land portion without increasing the density on the tread surface S.

Further, the tread has a center region extending between a ½ point of the tread which is a midpoint between the tread ends and ¼ points of the tread which are midpoint between the ½ point and the tread ends, and shoulder regions extending between the ¼ points and the tread ends, the sipe density (TLC/RC) which indicates the ratio of total value (TLC) of the longitudinal length of all the sipes in the tread surface of a center region to the total area (RC) of the land portion of the tread is not more than 0.25/mm, and the sipe density (TLS/RS) which indicates the ratio of total value (TLC) of the longitudinal length of all the sipes in the tread surface of a shoulder region to the total area (RC) of the land portion of the tread is not more than 0.2/mm.

In particular, it is preferable that the sipe density TLC/RC of the center region satisfies the above range and being not less than 0.0001/mm, and the sipe density TLS/RS of the shoulder region satisfies the above range and being not less than 0.0001/mm.

In general, the sipe density of the center region of the tread surface is larger than that of the shoulder region, therefore, the effect of the present invention may be exerted more effectively by defining the sipe density for each tread region.

Figure 5A:
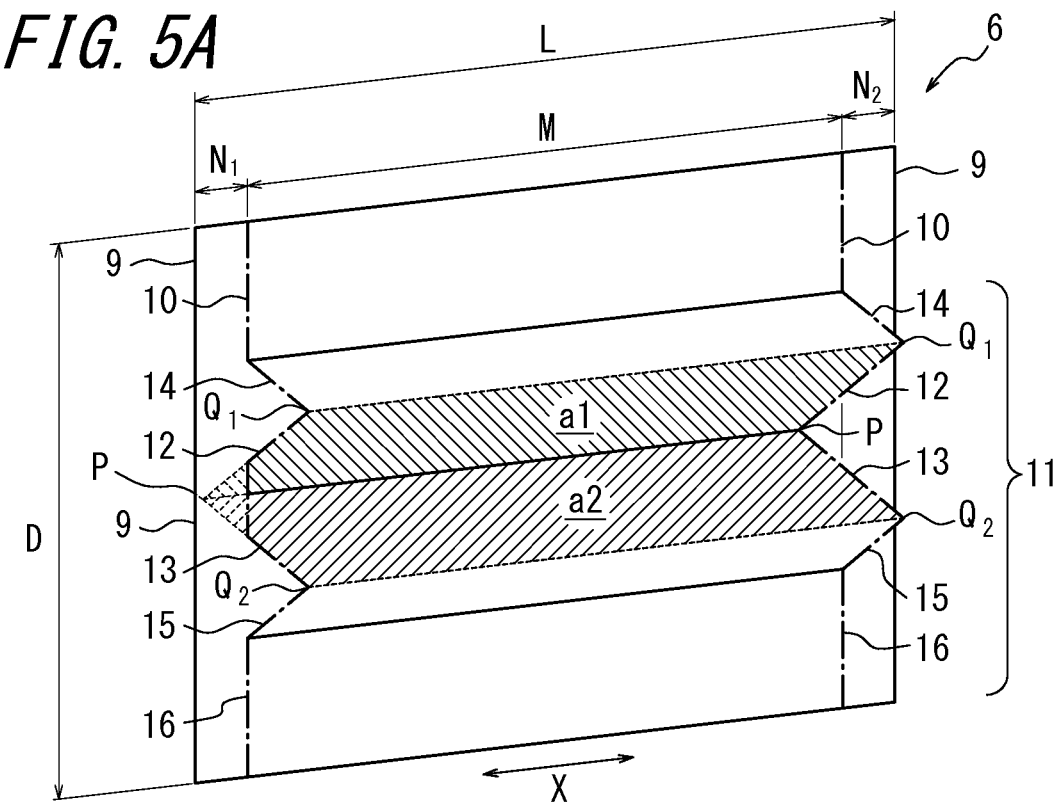
FIG. 5A is a drawing showing the shape of another sipe according to the present invention along the longitudinal direction of the sipe.

Further, in the example shown in FIG. 5A, the sipe 6 has a bend region in which the perpendicular portion and the bend portion formed from the tread surface S toward the direction of sipe depth are extended to the longitudinal direction of sipe, and at the both longitudinal ends of the bend region, a plate-like regions $N_1$, $N_2$ in which a straight portion 9 formed from the tread surface S toward the direction of sipe depth is extended to the longitudinal direction of sipe. In the same figure, the boundary between the bend region M and the plate-like region $N_1$, $N_2$ is shown by dash-dot lines. The part of the bend portion 11 which is behind the plate-like region $N_1$ and cannot be seen from the front of the drawing paper is indicated by dashed lines.

As described above, the sipe 6 has the bend region M at the center in the longitudinal direction of the sipe and the plate-like regions $N_1$, $N_2$ at both ends in the longitudinal direction of the sipe.

According to such structures, the bend region M located in the longitudinal center of the sipe is provided with the perpendicular portion 10 around the tread surface to prevent the sipe edge from being retracted between the tread surface and the road surface. As a result of that, it is possible to avoid the sipe edge from being lacked not only on icy-snowy road surface but even on a dry road surface having large frictional coefficient and input larger force to the tread surface. Further, it is also possible to improve the braking and driving performance on dry road surface because the bend portion 11 may prevent the deformation or leaning of the land portion 3, so as to be able to maintain the grounding property of tread surface.

Moreover, the plate-like regions $N_1$, $N_2$ located at the longitudinal end of the sipe configures the straightly extending part, thus, the effect to prevent the leaning of the land portion is reduced compared with the bend region, th scratching effect by the sipe edge may sufficiently be obtained, and the driving and braking performance on icy-snowy road may be increased.

Figure 6A:
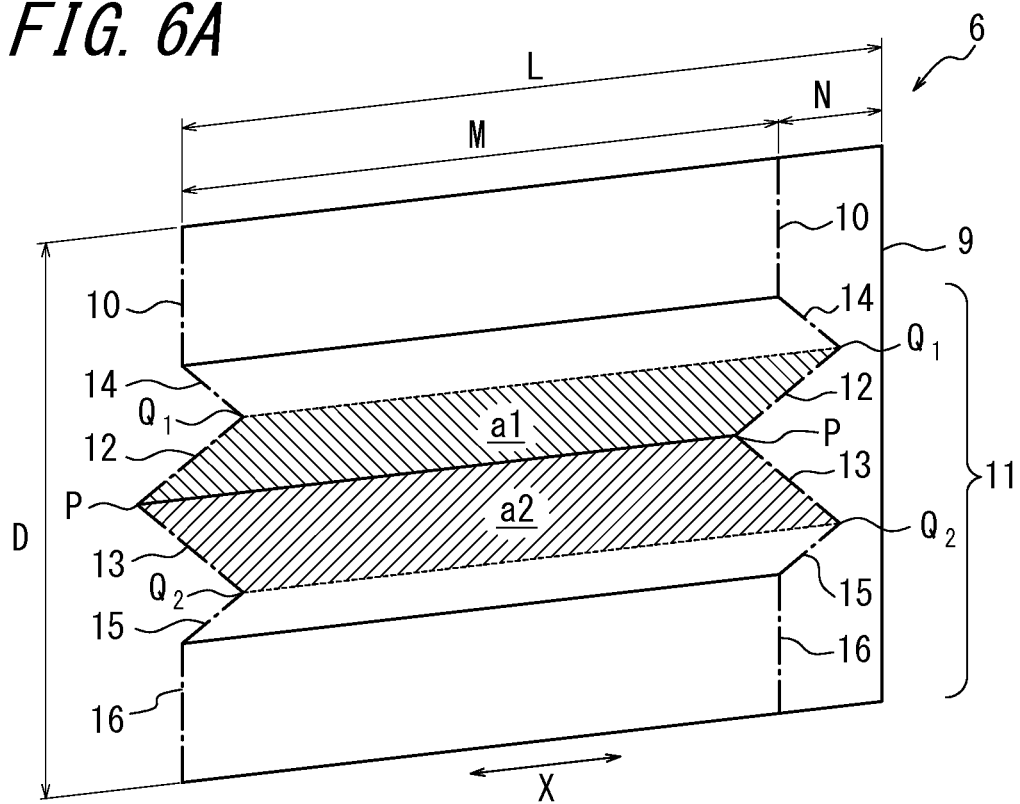
FIG. 6A is a drawing showing the shape of another sipe according to the present invention along the longitudinal direction of the sipe.
Figure 6B:
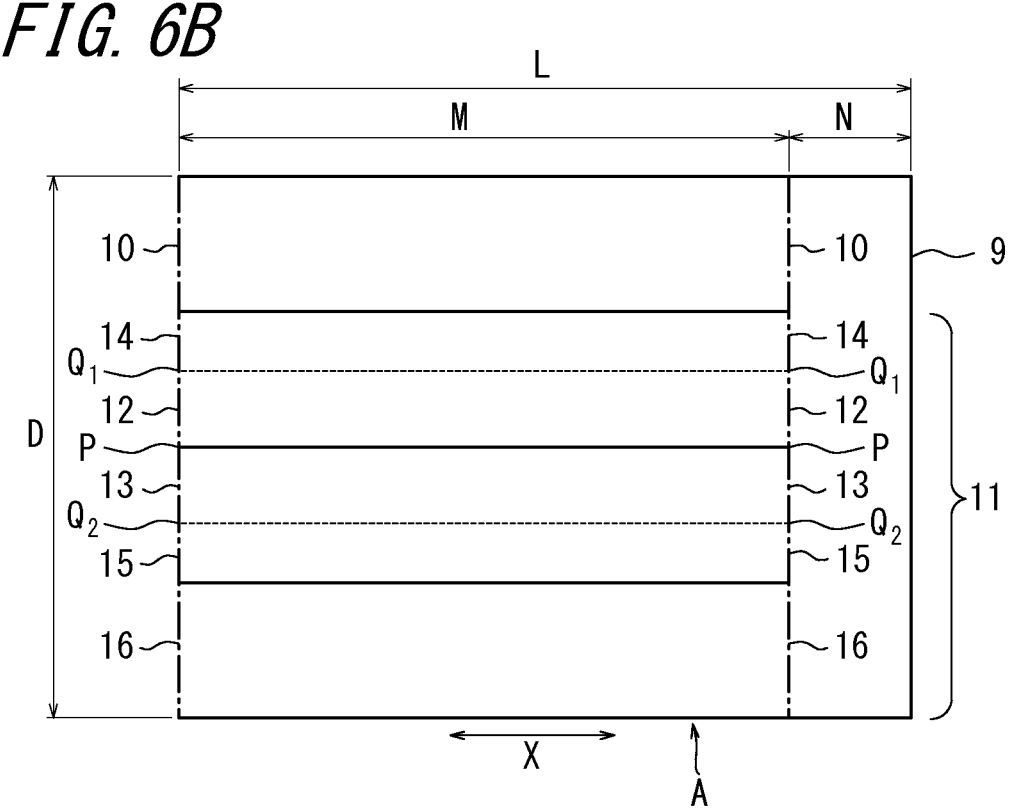
FIG. 6B is a projection surface positively projected from the width direction of the sipe described in FIG. 6A.

Now, the example having the plane-like region N at only one end of the bend region M is shown in FIG. 6.

As mentioned above, the sipe 6 shown in FIG. 5 has the plate-like region $N_1$, $N_2$ at the both longitudinal ends of the sipe, however, the sipe 6 may also have the plate-like region N at only one end as shown in FIG. 6. In this structure, same effect can be expected as in the case with having two plate-like regions $N_1, N_2$.

Figure 5B:
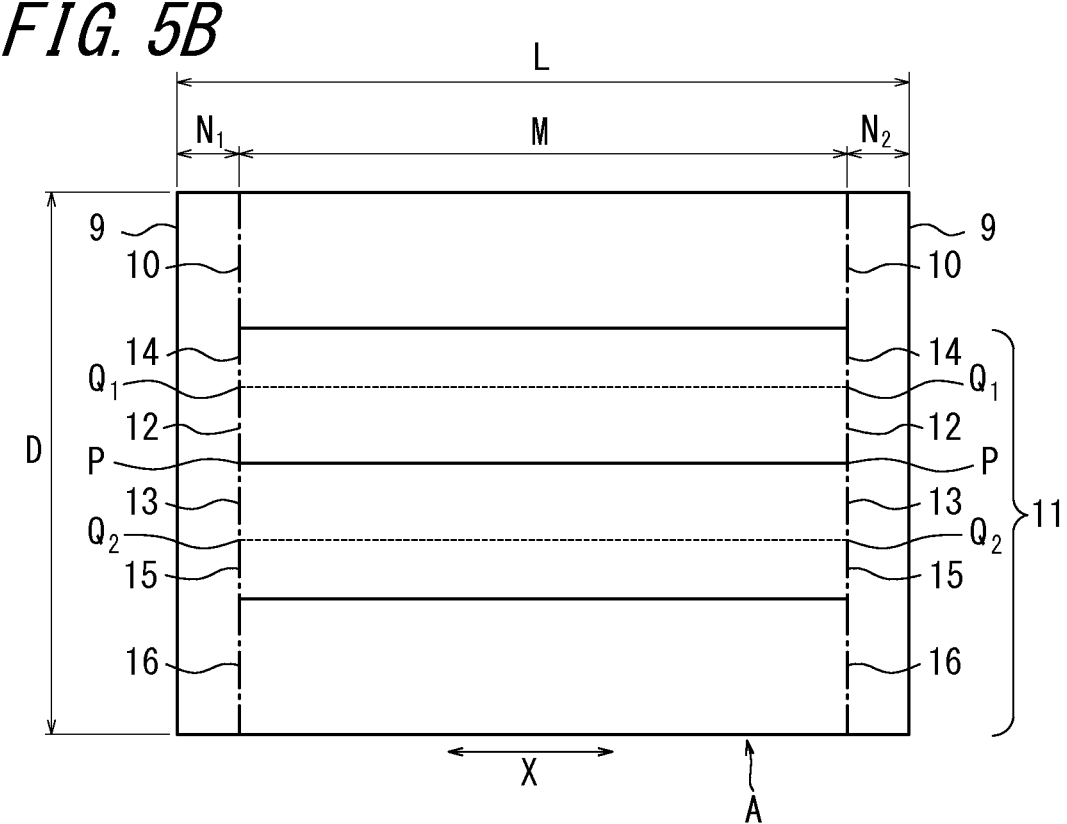
FIG. 5B is a projection surface positively projected from the width direction of the sipe described in FIG. 5A.

Furthermore, the sipe depth of the plate-like region N is same as that of the bend region M in FIG. 5 and FIG. 6, however, it may be different from the depth of the bend region M.

Moreover, it is preferable that the longitudinal length of the plate-like region is in a range of not less than 1% and not more than 95% of the longitudinal length L of the sipe.

According to the structure above, the scratching effect of the edge on the tread surface may sufficiently be obtained because the plate-like region helps the land portion moderately leaning, while the effect of preventing an excessive leaning of the land portion may be obtained because the bend region helps the land portion excessively leant. In this way, it is possible to improve the braking performance and the driving performance in well-balanced on both icy-snowy road surface and dry road surface because the icy-snowy performance may be improved at the longitudinal ends of the sipe while the dry performance may be improved at the longitudinal center of the sipe.

Moreover, when the longitudinal length of sipe 6 is shorter than that of the tread surface S, that is, when the longitudinal ends of the sipe 6 is not opened to the lateral groove 4 but stopped in the land portion, it is advantageous to provide the plate-like region at one edge end stopping in the land portion. This is because the manufacturing advantages, that it enables to surely pull out the mold from the tire product without lacking around the sipes.

The term, longitudinal length of the plate-like region N, in the case of having the plate-like regions at both longitudinal ends, means the length obtained by adding the length of both plate-like regions $N_1$, $N_2$. Therefore, the preferred range of the length of the plate-like region is the same regardless of having the plate-like region N at the one longitudinal end of sipe or having the plate-like regions N1, N2 separately at both longitudinal end of sipe.

The sipe 6 in FIG. 2 and FIG. 3 has a portion 16 straightly extending along the normal of the tread surface from the bottom of the inclined section 15 towards the bottom of the land portion. However, the sipe may be formed in a shape which does not have the portion 16, instead, have straight line extending from the bottom of the second sub bend point Q2 toward the bottom of the land portion.

So far, the explanation has been made with reference to the embodiments having sipes extending to the tire width direction, however the sipe according to the present invention may be applied for the sipe extending in a circumferential direction. In this case, especially the cornering performance at cornering may be improved.

Further, the sipe 6 described in FIG. 6 has straight line on the tread surface, however, other shapes, for example, zigzag-shaped or wave-shaped may be employed. Each land portion illustrated in FIG. 1 is provided four sipes; however, the number of sipes may be one to three, or not less than five. Furthermore, the sipe 6 opens at the both end of the land portion 3, however, at least one end of the sipe 6 may be ended at internal of the land portion.

Example 1

In order to confirm the effect of the present invention, experimentally manufactured the following tires; Invention Example tires (Invex) 1-1 through 1-5 according to the first aspect of the present invention, Convention Example tire (Convex) according to the conventional examples, and Comparative Example tires (Comex) 1-1 through 1-3, and evaluated each tires.

Invention tire 1-1 having tire size 205/55R16, a tread pattern described in FIG. 1, and each block-shaped land portion is provided with four sipes described in FIG. 2 and FIG. 3. The sipes are straightly extending toward the tire width direction on a road surface as described in FIG. 1. Each elements of tire is shown in Table 1-1.

Invention tires 1-2 through 1-5 is same as the invention tire 1-1 except that the each element of the sipes are varied as in Table 1.

Figure 7:
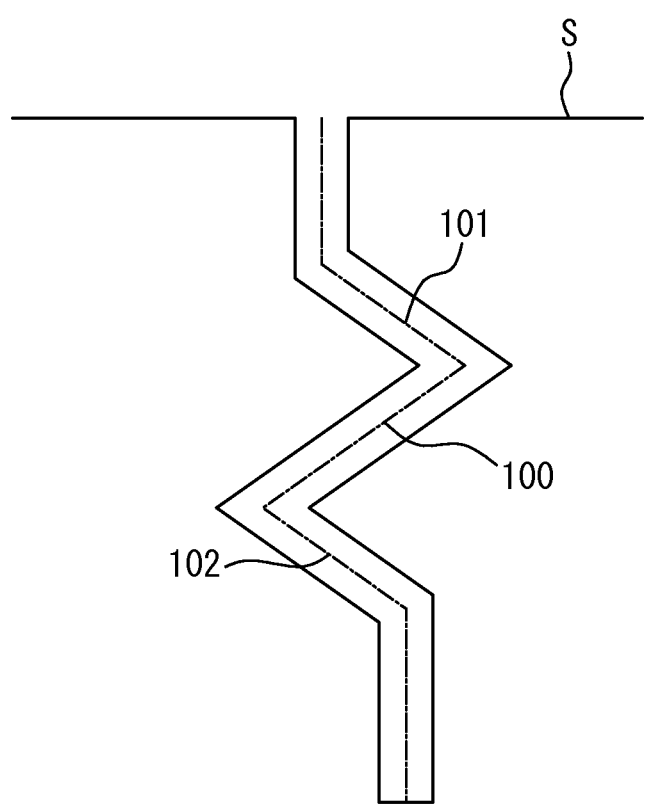
FIG. 7 is a sectional view when the land portion of the conventional pneumatic tire is cut in the width direction of the sipe.

Convention tire is same as the invention tire 1-1 except that the sipe shape in the cross-sectional view when taken along a plane which is perpendicular to the longitudinal direction of the sipe is as shown in FIG. 7.

Comparative tires 1-1 and 1-2 are same as the invention tire 1-1 except that the each elements of the sipes is varied as in Table 1-1.

Further, comparative tire 1-3 is same as the Invention Example tire 1-1 except that the sipes never comprise perpendicular portion so that the bend portion extends in a zigzag manner from the tread surface towards the sipe depth direction having six folding points (forming a triangular waveform with constant amplitude). The angle between the folding direction of the sipe and the direction perpendicular to the normal is 30.256°, and the sipe has a portion having a length of 0.49D from the end of the bottom side of the bend portion towards the bottom of the land portion.

TABLE 1-1

|  | Invex 1-1 | Invex 1-2 | Invex 1-3 | Invex 1-4 | Invex 1-5 | Comex 1-1 | Comex 1-2 | Comex 1-3 |
|---|---|---|---|---|---|---|---|---|
| Sipe depth D (mm) | 7 | 7 | 7 | 7 | 7 | 7 | 7 | 7 |
| Position of P from tread surface S (mm) | 0.500D | 0.250D | 0.750D | 0.500D | 0.500D | 0.197D | 0.800D | — |
| Position of $Q_1$ from tread surface S (mm) | 0.333D | 0.170D | 0.435D | 0.333D | 0.333D | 0.117D | 0.720D | — |
| Position of $Q_2$ from tread surface S (mm) | 0.666D | 0.565D | 0.830D | 0.666D | 0.666D | 0.277D | 0.880D | — |
| $\theta_1$ (°) | 45 | 30.256 | 60 | 45 | 45 | 30.256 | 30.256 | — |
| $\theta_2$ (°) | 45 | 60 | 30.256 | 45 | 45 | 30.256 | 30.256 | — |
| $W_1$ (mm) | 0.200D | 0.136D | 0.182D | 0.200D | 0.200D | 0.136D | 0.136D | — |
| $W_2$ (mm) | 0.200D | 0.182D | 0.136D | 0.200D | 0.200D | 0.136D | 0.136D | — |
| Shortest distance between adjacent sipes (mm) | 1.200D | 1.200D | 1.200D | 0.800D | 10.000D | 0.800D | 0.800D | 1.200D |
| Length of perpendicular section 10 (mm) | 0.250D | 0.144D | 0.382D | 0.250D | 0.250D | 0.091D | 0.694D | 0 |

Evaluated the braking and driving performance by comparing the coefficient of friction of the land portions, which are obtained by contacting the walls facing each other across the sipe when the tire being subjected to a large shear force at a constant load conditions. At this time, applied the shear force from two-way, that is, from both directions of the left side and the right side of the drawing papers in the boundary of the sipes described in FIG. 3 and FIG. 4, and compared the coefficient of friction in average.

The results are also shown in Table 1-1. The coefficient of friction described in Table 1 are expressed as an exponential factor that the conventional examples is 100. The larger value means better performance.

TABLE 1-2

|  | Invex 1-1 | Invex 1-2 | Invex 1-3 | Invex 1-4 | Invex 1-5 | Convex 1-5 | Comex 1-1 | Comex 1-2 | Comex 1-3 |
|---|---|---|---|---|---|---|---|---|---|
| Friction coefficient of the land portions | 105 | 103 | 104 | 101 | 107 | 100 | 97 | 98 | 98 |

As can be seen from table 2, all of Invention Example Tires 1-1 through 1-5 has larger coefficient of friction than the Conventional Example tire. Thus, all of the Invention Example tires 1-1 through 1-5 may be improved braking and driving performance compared to the Conventional Example tire. Further, because the average coefficient of friction of Comparative Example tires 1-1 and 1-2 was small, it could be confirmed that the braking and driving performance ware able to be improved when the main bend point locates in the depth region of not less than D/4 and not more than 3D/4 from the tread surface. The lacks of sipe edge were found in the Comparative Example tires 1-3.

Example 2

In order to confirm the effect of the present invention, experimentally manufactured the following tires; Invention Example tires (Invex) 2-1 through 2-15 according to the second aspect of the present invention, Convention Example tire (Convex) according to the conventional example, and Comparative Example tires (Comex) 2-1 through 2-9, and evaluated each tires.

The Invention Tire 2-1 having tire size 205/55R16, a tread pattern described in FIG. 1, and each block-shaped land portion is provided with four sipes described in FIG. 2 and FIG. 3. The sipes are straightly extending toward the tire width direction on a road surface as described in FIG. 1. Each elements of tire is shown in Table 1.

Invention tires 2-2 through 2-15 is same as the invention tire 2-1 except that the each element of the sipe are varied as in Tables 2-1 and 2-2.

Convention tire is same as the Invention Example tire 2-1 except that the sipe shape in the cross-sectional view when taken along a plane which is perpendicular to the longitudinal direction of the sipe is as shown in FIG. 7.

Comparative tires 2-1 through 2-8 are same as the Invention Example tire 1-1 except that the each elements of the sipes is varied as in Table 1-1. Comparative tire 2-9 is same tire as the Comparative Example tire 1-3 of Example 1.

TABLE 2-1

|  | Invex 2-1 | Invex 2-2 | Invex 2-3 | Invex 2-4 | Invex 2-5 | Invex 2-6 | Invex 2-7 | Invex 2-8 | Invex 2-9 | Invex 2-10 | Invex 2-11 | Invex 2-12 |
|---|---|---|---|---|---|---|---|---|---|---|---|---|
| Sipe depth D (mm) | 7 | 7 | 7 | 7 | 7 | 7 | 7 | 7 | 7 | 7 | 7 | 7 |
| Position of $1^{st}$ sub bend point $Q_1$ from tread surface S (mm) | 0.142D | 0.333D | 0.500D | 0.333D | 0.333D | 0.333D | 0.333D | 0.333D | 0.333D | 0.333D | 0.333D | 0.333D |
| Position of main bend point P from tread surface S (mm) | 0.321D | 0.500D | 0.675D | 0.500D | 0.500D | 0.500D | 0.500D | 0.500D | 0.500D | 0.500D | 0.500D | 0.500D |
| Position of $2^{nd}$ sub bend point $Q_2$ from tread surface S (mm) | 0.500D | 0.666D | 0.850D | 0.666D | 0.666D | 0.666D | 0.666D | 0.666D | 0.666D | 0.666D | 0.666D | 0.666D |
| a1/A (a1: area of the $1^{st}$ inclined section, A: the projected area thereof) | 0.60 | 0.60 | 0.60 | 0.10 | 0.25 | 0.50 | 0.40 | 0.40 | 0.40 | 0.40 | 0.40 | 0.40 |
| a2/A (a2: area of the $2^{nd}$ inclined section, A: the projected area thereof) | 0.60 | 0.60 | 0.60 | 0.10 | 0.25 | 0.50 | 0.40 | 0.40 | 0.40 | 0.40 | 0.40 | 0.40 |
| Tangential distance $W_1$ of tread surface S of the $1^{st}$ inclined section (mm) | 0.400D | 0.400D | 0.400D | 0.400D | 0.400D | 0.400D | 0.070D | 0.165D | 0.330D | 0.250D | 0.250D | 0.250D |
| Tangential distance $W_2$ of tread surface S of the $2^{nd}$ inclined section (mm) | 0.400D | 0.400D | 0.400D | 0.400D | 0.400D | 0.400D | 0.070D | 0.165D | 0.330D | 0.250D | 0.250D | 0.250D |
| The shortest distance between adjacent sipes (mm) | 0.800D | 0.800D | 0.800D | 0.800D | 0.800D | 0.800D | 0.800D | 0.800D | 0.800D | 1.200D | 10.000D | 10.000D |
| Sipe density of entire tread TL/R (/mm) | 0.35 | 0.35 | 0.35 | 0.35 | 0.35 | 0.35 | 0.35 | 0.35 | 0.35 | 0.35 | 0.35 | 0.08 |
| Sipe density of center region TLc/Rc (/mm) | 0.40 | 0.40 | 0.40 | 0.40 | 0.40 | 0.40 | 0.40 | 0.40 | 0.40 | 0.40 | 0.40 | 0.40 |
| Sipe density of shoulder region TLs/Rs (/mm) | 0.30 | 0.30 | 0.30 | 0.30 | 0.30 | 0.30 | 0.30 | 0.30 | 0.30 | 0.30 | 0.30 | 0.30 |
| Length of the normal direction of the perpendicular portion (mm) | 0.12D | 0.12D | 0.12D | 0.12D | 0.12D | 0.12D | 0.12D | 0.12D | 0.12D | 0.12D | 0.12D | 0.12D |

TABLE 2-2

| | Invex 2-13 | Invex 2-14 | Invex 2-15 | Comex 2-1 | Comex 2-2 | Comex 2-3 | Comex 2-4 | Comex 2-5 | Comex 2-6 | Comex 2-7 | Comex 2-8 | Comex 2-9 |
|---|---|---|---|---|---|---|---|---|---|---|---|---|
| Sipe depth D (mm) | 7 | 7 | 7 | 7 | 7 | 7 | 7 | 7 | 7 | 7 | 7 | 7 |
| Position of $1^{st}$ sub bend point $Q_1$ from tread surface S (mm) | 0.333D | 0.333D | 0.333D | 0.050D | 0.333D | 0.333D | 0.333D | 0.333D | 0.117D | 0.720D | 0.720D | — |
| Position of main bend point P from tread surface S (mm) | 0.500D | 0.500D | 0.500D | 0.500D | 0.500D | 0.500D | 0.500D | 0.500D | 0.197D | 0.800D | 0.800D | — |
| Position of $2^{nd}$ sub bend point $Q_2$ from tread surface S (mm) | 0.666D | 0.666D | 0.666D | 0.666D | 0.900D | 0.666D | 0.666D | 0.666D | 0.277D | 0.880D | 0.880D | — |
| a1/A (a1: area of the $1^{st}$ inclined section, A: the projected area thereof) | 0.40 | 0.40 | 0.40 | 0.15 | 0.15 | 0.05 | 0.15 | 0.05 | 0.15 | 0.15 | 0.05 | — |
| a2/A (a2: area of the $2^{nd}$ inclined section, A: the projected area thereof) | 0.40 | 0.40 | 0.40 | 0.15 | 0.15 | 0.15 | 0.05 | 0.05 | 0.15 | 0.15 | 0.05 | — |
| Tangential distance $W_1$ of tread surface S of the $1^{st}$ inclined section (mm) | 0.250D | 0.250D | 0.250D | 0.400D | 0.400D | 0.400D | 0.400D | 0.400D | 0.400D | 0.400D | 0.400D | — |
| Tangential distance $W_2$ of tread surface S of the $2^{nd}$ inclined section (mm) | 0.250D | 0.250D | 0.250D | 0.400D | 0.400D | 0.400D | 0.400D | 0.400D | 0.400D | 0.400D | 0.400D | — |
| The shortest distance between adjacent sipes (mm) | 10.000D | 10.000D | 10.000D | 0.800D | 0.800D | 0.800D | 0.800D | 0.800D | 0.800D | 0.800D | 0.800D | 1.200D |
| Sipe density of entire tread TL/R (/mm) | 0.08 | 0.08 | 0.08 | 0.35 | 0.35 | 0.35 | 0.35 | 0.35 | 0.35 | 0.35 | 0.35 | 0.35 |
| Sipe density of center region TLc/Rc (/mm) | 0.09 | 0.09 | 0.09 | 0.40 | 0.40 | 0.40 | 0.40 | 0.40 | 0.40 | 0.40 | 0.40 | 0.40 |
| Sipe density of shoulder region TLs/Rs (/mm) | 0.30 | 0.07 | 0.07 | 0.30 | 0.30 | 0.30 | 0.30 | 0.30 | 0.30 | 0.30 | 0.30 | 0.30 |
| Length of the normal direction of the perpendicular portion (mm) | 0.12D | 0.12D | 0.18D | 0.12D | 0.12D | 0.12D | 0.12D | 0.12D | 0.12D | 0.12D | 0.12D | 0 |

Mounted the aforementioned example tires to the approved rims and inflated with specified internal pressure, then evaluated the braking and driving performance by comparing the coefficient of friction of the land portions, which are obtained by contacting the walls facing each other across the sipe when the tire being subjected to a large shear force at a constant load conditions. At this time, applied the shear force from two-way, that is, from both directions of the left side and the right side of the drawing papers in the boundary of the sipes described in FIG. 3 and FIG. 4, and compared the coefficient of friction in average.

The results are also shown in Table 2-3. The coefficient of friction shown in Table 2-3 are expressed as index factors assuming that the value for the conventional examples is 100. The larger value means the better performance.

TABLE 2-3

| | Invex 2-1 | Invex 2-2 | Invex 2-3 | Invex 2-4 | Invex 2-5 | Invex 2-6 | Invex 2-7 | Invex 2-8 |
|---|---|---|---|---|---|---|---|---|
| Coefficient of friction of land portion | 106 | 106 | 107 | 108 | 108 | 109 | 110 | 110 |

| | Invex 2-9 | Invex 2-10 | Invex 2-11 | Invex 2-12 | Invex 2-13 | Invex 2-14 | Invex 2-15 | Comex 2-1 |
|---|---|---|---|---|---|---|---|---|
| Coefficient of friction of land portion | 111 | 113 | 113 | 115 | 117 | 118 | 120 | 93 |

| | Comex 2-2 | Comex 2-3 | Comex 2-4 | Comex 2-5 | Comex 2-6 | Comex 2-7 | Comex 2-8 | Comex 2-9 |
|---|---|---|---|---|---|---|---|---|
| Coefficient of friction of land portion | 95 | 92 | 93 | 94 | 93 | 92 | 93 | 91 |

As can be seen from table 2, all of Invention Example Tires 2-1 through 2-15 has larger coefficient of friction than the Conventional Example tire. Thus, all of the Invention Example tires 1-1 through 1-5 may be improved braking and driving performance compared to the Conventional Example tire. Further, because the average coefficient of friction of Comparative Example tires 2-1 and 2-9 was small, it could be confirmed that the braking and driving performance ware able to be improved especially when the main-bend point locates in the depth region of not less than D/4 and not more than 3D/4 from the tread surface, and the ratio a1/A, of the area a1 to the projected area (A) of the sipe in an orthogonal projection in the width direction of the sipe, and the ratio a2/A of the area (a2) to said projected area (A) of the sipe, wherein the ratios (a1/A, a2/A) of the first and second inclined sections are both not more than 0.5. The lacks of sipe edge were found in the Comparative Example tires 2-9.

Example 3

In order to confirm the effect of the tire comprising the sipes according to the second aspect of the present invention, wherein having plate-like regions at either side or both sides of the longitudinal direction of the sipe, manufactured the following tires; Invention Example tires (Invex) 3-1 through 3-25 according to the second aspect of the present invention, Convention Example tire (Convex) according to the conventional example, and Comparative Example tires (Comex) 3-1 through 3-12, and evaluated each tires.

The Invention Tire 3-1 having tire size 205/55R16, a tread pattern described in FIG. 1, and each block-shaped land portion is provided with four sipes described in FIG. 2 and FIG. 3. The sipes are straightly extending toward the tire width direction on a road surface as described in FIG. 1. Each elements of tire is shown in Table 3.

Invention tires 3-2 through 3-25 is same as the invention tire 3-1 except that the each element of the sipe are varied as in Table 3.

Convention tire is same as the Invention Example tire 3-1 except that the sipe shape in the cross-sectional view when taken along a plane which is perpendicular to the longitudinal direction of the sipe is as shown in FIG. 7.

Comparative tires 3-1 through 3-12 are same as the Invention Example tire 3-1 except that the each elements of the sipes is varied as in Table 3. Comparative tire 3-12 is same tire as the Comparative Example tire 1-3 of Example 1.

TABLE 3-1

|  | Invex 3-1 | Invex 3-2 | Invex 3-3 | Invex 3-4 | Invex 3-5 | Invex 3-6 | Invex 3-7 | Invex 3-8 | Invex 3-9 | Invex 3-10 |
|---|---|---|---|---|---|---|---|---|---|---|
| Sipe depth D (mm) | 7 | 7 | 7 | 7 | 7 | 7 | 7 | 7 | 7 | 7 |
| Position of $1^{st}$ sub bend point $Q_1$ from tread surface S (mm) | 0.142D | 0.142D | 0.333D | 0.333D | 0.500D | 0.500D | 0.142D | 0.142D | 0.333D | 0.333D |
| Position of main bend point P from tread surface S (mm) | 0.321D | 0.321D | 0.500D | 0.500D | 0.675D | 0.675D | 0.321D | 0.321D | 0.500D | 0.500D |
| Position of $2^{nd}$ sub bend point $Q_2$ from tread surface S(mm) | 0.500D | 0.500D | 0.666D | 0.666D | 0.850D | 0.850D | 0.500D | 0.500D | 0.666D | 0.666D |
| Presence or absence of plate-like region N | One end | One end | One end | One end | One end | One end | Both Ends | Both Ends | Both Ends | Both Ends |
| Percentage of plate-like region of the longitudinal length of sipe (%) | 0.1 | 98 | 0.1 | 98 | 0.1 | 98 | 0.1 | 98 | 0.1 | 98 |
| a1/A (a1: area of the $1^{st}$ inclined section, A: the projected area thereof) | 0.60 | 0.60 | 0.60 | 0.60 | 0.60 | 0.60 | 0.60 | 0.60 | 0.60 | 0.60 |
| a2/A (a2: area of the $2^{nd}$ inclined section, A: the projected area thereof) | 0.60 | 0.60 | 0.60 | 0.60 | 0.60 | 0.60 | 0.60 | 0.60 | 0.60 | 0.60 |
| Tangential distance $W_1$ of tread surface S of the $1^{st}$ inclined section (mm) | 0.40D | 0.40D | 0.40D | 0.40D | 0.40D | 0.40D | 0.40D | 0.40D | 0.40D | 0.40D |
| Tangential distance $W_2$ of tread surface S of the $2^{nd}$ inclined section (mm) | 0.40D | 0.40D | 0.40D | 0.40D | 0.40D | 0.40D | 0.40D | 0.40D | 0.40D | 0.40D |
| The shortest distance between adjacent sipes (mm) | 0.8D | 0.8D | 0.8D | 0.8D | 0.8D | 0.8D | 0.8D | 0.8D | 0.8D | 0.8D |
| Sipe density of entire tread TL/R (/mm) | 0.35 | 0.35 | 0.35 | 0.35 | 0.35 | 0.35 | 0.35 | 0.35 | 0.35 | 0.35 |
| Sipe density of center region TLc/Rc (/mm) | 0.40 | 0.40 | 0.40 | 0.40 | 0.40 | 0.40 | 0.40 | 0.40 | 0.40 | 0.40 |
| Sipe density of shoulder region TLs/Rs (/mm) | 0.30 | 0.30 | 0.30 | 0.30 | 0.30 | 0.30 | 0.30 | 0.30 | 0.30 | 0.30 |
| Length of the normal direction of the perpendicular portion (mm) | 0.12D | 0.12D | 0.12D | 0.12D | 0.12D | 0.12D | 0.12D | 0.12D | 0.12D | 0.12D |

|  | Invex 3-11 | Invex 3-12 | Invex 3-13 | Invex 3-14 | Invex 3-15 | Invex 3-16 | Invex 3-17 | Invex 3-18 | Invex 3-19 |
|---|---|---|---|---|---|---|---|---|---|
| Sipe depth D (mm) | 7 | 7 | 7 | 7 | 7 | 7 | 7 | 7 | 7 |
| Position of $1^{st}$ sub bend point $Q_1$ from tread surface S (mm) | 0.500D | 0.500D | 0.333D | 0.333D | 0.333D | 0.333D | 0.333D | 0.333D | 0.333D |
| Position of main bend point P from tread surface S (mm) | 0.675D | 0.675D | 0.500D | 0.500D | 0.500D | 0.500D | 0.500D | 0.500D | 0.500D |
| Position of $2^{nd}$ sub bend point $Q_2$ from tread surface S(mm) | 0.850D | 0.850D | 0.666D | 0.666D | 0.666D | 0.666D | 0.666D | 0.666D | 0.666D |

TABLE 3-1-continued

|  | | | | | | | | | |
|---|---|---|---|---|---|---|---|---|---|
| Presence or absence of plate-like region N | Both Ends | Both Ends | One end | One end | One end | Both Ends | Both Ends | Both Ends | Both Ends |
| Percentage of plate-like region of the longitudinal length of sipe (%) | 0.1 | 98 | 1 | 50 | 95 | 1 | 50 | 95 | 50 |
| a1/A (a1: area of the $1^{st}$ inclined section, A: the projected area thereof) | 0.60 | 0.60 | 0.60 | 0.60 | 0.60 | 0.60 | 0.60 | 0.60 | 0.25 |
| a2/A (a2: area of the $2^{nd}$ inclined section, A: the projected area thereof) | 0.60 | 0.60 | 0.60 | 0.60 | 0.60 | 0.60 | 0.60 | 0.60 | 0.25 |
| Tangential distance $W_1$ of tread surface S of the $1^{st}$ inclined section (mm) | 0.40D | 0.40D | 0.40D | 0.40D | 0.40D | 0.40D | 0.40D | 0.40D | 0.40D |
| Tangential distance $W_2$ of tread surface S of the $2^{nd}$ inclined section (mm) | 0.40D | 0.40D | 0.40D | 0.40D | 0.40D | 0.40D | 0.40D | 0.40D | 0.40D |
| The shortest distance between adjacent sipes (mm) | 0.8D | 0.8D | 0.8D | 0.8D | 0.8D | 0.8D | 0.8D | 0.8D | 0.8D |
| Sipe density of entire tread TL/R (/mm) | 0.35 | 0.35 | 0.35 | 0.35 | 0.35 | 0.35 | 0.35 | 0.35 | 0.35 |
| Sipe density of center region TLc/Rc (/mm) | 0.40 | 0.40 | 0.40 | 0.40 | 0.40 | 0.40 | 0.40 | 0.40 | 0.40 |
| Sipe density of shoulder region TLs/Rs (/mm) | 0.30 | 0.30 | 0.30 | 0.30 | 0.30 | 0.30 | 0.30 | 0.30 | 0.30 |
| Length of the normal direction of the perpendicular portion (mm) | 0.12D | 0.12D | 0.12D | 0.12D | 0.12D | 0.12D | 0.12D | 0.12D | 0.12D |

TABLE 3-2

|  | Invex 3-20 | Invex 3-21 | Invex 3-22 | Invex 3-23 | Invex 3-24 | Invex 3-25 | Comex 3-1 | Comex 3-2 | Comex 3-3 | Comex 3-4 |
|---|---|---|---|---|---|---|---|---|---|---|
| Sipe depth D (mm) | 7 | 7 | 7 | 7 | 7 | 7 | 7 | 7 | 7 | 7 |
| Position of $1^{st}$ sub bend point $Q_1$ from tread surface S (mm) | 0.333D | 0.333D | 0.333D | 0.333D | 0.333D | 0.333D | 0.050D | 0.333D | 0.050D | 0.333D |
| Position of main bend point P from tread surface S (mm) | 0.500D | 0.500D | 0.500D | 0.500D | 0.500D | 0.500D | 0.500D | 0.500D | 0.500D | 0.500D |
| Position of $2^{nd}$ sub bend point $Q_2$ from tread surface S(mm) | 0.666D | 0.666D | 0.666D | 0.666D | 0.666D | 0.666D | 0.666D | 0.900D | 0.666D | 0.900D |
| Presence or absence of plate-like region N | Both Ends | Both Ends | Both Ends | Both Ends | Both Ends | Both Ends | One End | One End | Both Ends | Both Ends |
| Percentage of plate-like region of the longitudinal length of sipe (%) | 50 | 50 | 50 | 50 | 50 | 50 | 0.1 | 0.1 | 0.1 | 0.1 |
| a1/A (a1: area of the $1^{st}$ inclined section, A: the projected area thereof) | 0.25 | 0.25 | 0.25 | 0.25 | 0.25 | 0.25 | 0.60 | 0.60 | 0.60 | 0.60 |
| a2/A (a2: area of the $2^{nd}$ inclined section, A: the projected area thereof) | 0.25 | 0.25 | 0.25 | 0.25 | 0.25 | 0.25 | 0.60 | 0.60 | 0.60 | 0.60 |
| Tangential distance $W_1$ of tread surface S of the $1^{st}$ inclined section (mm) | 0.25D | 0.25D | 0.25D | 0.25D | 0.25D | 0.25D | 0.40D | 0.40D | 0.40D | 0.40D |
| Tangential distance $W_2$ of tread surface S of the $2^{nd}$ inclined section (mm) | 0.25D | 0.25D | 0.25D | 0.25D | 0.25D | 0.25D | 0.40D | 0.40D | 0.40D | 0.40D |
| The shortest distance between adjacent sipes (mm) | 0.8D | 1.2D | 1.2D | 1.2D | 1.2D | 1.2D | 0.8D | 0.8D | 0.8D | 0.8D |
| Sipe density of entire tread TL/R (/mm) | 0.35 | 0.35 | 0.08 | 0.08 | 0.08 | 0.08 | 0.35 | 0.35 | 0.35 | 0.35 |
| Sipe density of center region TLc/Rc (/mm) | 0.40 | 0.40 | 0.40 | 0.09 | 0.09 | 0.09 | 0.40 | 0.40 | 0.40 | 0.40 |
| Sipe density of shoulder region TLs/Rs (/mm) | 0.30 | 0.30 | 0.30 | 0.30 | 0.07 | 0.07 | 0.30 | 0.30 | 0.30 | 0.30 |
| Length of the normal direction of the perpendicular portion (mm) | 0.12D | 0.12D | 0.12D | 0.12D | 0.12D | 0.18D | 0.12D | 0.12D | 0.12D | 0.12D |

TABLE 3-2-continued

|  | Comex 3-5 | Comex 3-6 | Comex 3-7 | Comex 3-8 | Comex 3-9 | Comex 3-10 | Comex 3-11 | Comex 3-12 |
|---|---|---|---|---|---|---|---|---|
| Sipe depth D (mm) | 7 | 7 | 7 | 7 | 7 | 7 | 7 | 7 |
| Position of $1^{st}$ sub bend point $Q_1$ from tread surface S (mm) | 0.333D | 0.117D | 0.720D | 0.117D | 0.720D | 0.117D | 0.720D | — |
| Position of main bend point P from tread surface S (mm) | 0.500D | 0.197D | 0.800D | 0.197D | 0.800D | 0.197D | 0.800D | — |
| Position of $2^{nd}$ sub bend point $Q_2$ from tread surface S(mm) | 0.666D | 0.277D | 0.880D | 0.277D | 0.880D | 0.277D | 0.880D | — |
|  | None | One End | One End | Both Ends | Both Ends | None | None | — |
| Presence or absence of plate-like region N | — | 0.1 | 0.1 | 0.1 | 0.1 | — | — | — |
| Percentage of plate-like region of the longitudinal length of sipe (%) | 0.60 | 0.60 | 0.60 | 0.60 | 0.60 | 0.60 | 0.60 | — |
| a1/A (a1: area of the $1^{st}$ inclined section, A: the projected area thereof) | 0.60 | 0.60 | 0.60 | 0.60 | 0.60 | 0.60 | 0.60 | — |
| a2/A (a2: area of the $2^{nd}$ inclined section, A: the projected area thereof) | 0.40D | 0.40D | 0.40D | 0.40D | 0.40D | 0.40D | 0.40D | — |
| Tangential distance $W_1$ of tread surface S of the $1^{st}$ inclined section (mm) | 0.40D | 0.40D | 0.40D | 0.40D | 0.40D | 0.40D | 0.40D | — |
| Tangential distance $W_2$ of tread surface S of the $2^{nd}$ inclined section (mm) | 0.8D | 0.8D | 0.8D | 0.8D | 0.8D | 0.8D | 0.8D | 1.2D |
| The shortest distance between adjacent sipes (mm) | 0.35 | 0.35 | 0.35 | 0.35 | 0.35 | 0.35 | 0.35 | 0.35 |
| Sipe density of entire tread TL/R (/mm) | 0.40 | 0.40 | 0.40 | 0.40 | 0.40 | 0.40 | 0.40 | 0.40 |
| Sipe density of center region TLc/Rc (/mm) | 0.30 | 0.30 | 0.30 | 0.30 | 0.30 | 0.30 | 0.30 | 0.30 |
| Sipe density of shoulder region TLs/Rs (/mm) | 0.12D | 0.12D | 0.12D | 0.12D | 0.12D | 0.12D | 0.12D | 0 |

(Braking and Driving Performance)

Evaluated the braking and driving performance by comparing the coefficient of friction of the land portions, which are obtained by contacting the walls facing each other across the sipe when the tire being subjected to a large shear force at a constant load conditions. At this time, applied the shear force from two-way, that is, from both directions of the left side and the right side of the drawing papers in the boundary of the sipes described in FIG. 3 and FIG. 4, and compared the coefficient of friction in average.

(On Ice and Snow Performance)

Evaluated on ice and snow performance by the acceleration test on snowy road surface wherein placed an vehicle on icy-snowy road surface, fully opened the accelerator from resting state, and measured the time (acceleration time) to run 50 m.

The results are also shown in Table 3-3. The coefficient of friction described in Table 3 are expressed as an exponential factor that the conventional examples is 100. The larger value means better performance.

TABLE 3-3

|  | Invex 3-1 | Invex 3-2 | Invex 3-3 | Invex 3-4 | Invex 3-5 | Invex 3-6 | Invex 3-7 | Invex 3-8 | Invex 3-9 | Invex 3-10 | Invex 3-11 | Invex 3-12 |
|---|---|---|---|---|---|---|---|---|---|---|---|---|
| Coefficient of friction of land portion | 102 | 103 | 106 | 104 | 105 | 103 | 104 | 104 | 105 | 105 | 106 | 106 |
| On ice and snow performance | 101 | 103 | 104 | 104 | 102 | 103 | 104 | 103 | 105 | 105 | 105 | 104 |

|  | Invex 3-13 | Invex 3-14 | Invex 3-15 | Invex 3-16 | Invex 3-17 | Invex 3-18 | Invex 3-19 | Invex 3-20 | Invex 3-21 | Invex 3-22 | Invex 3-23 | Invex 3-24 | Invex 3-25 |
|---|---|---|---|---|---|---|---|---|---|---|---|---|---|
| Coefficient of friction of land portion | 107 | 109 | 108 | 110 | 111 | 110 | 112 | 114 | 115 | 116 | 117 | 119 | 120 |
| On ice and snow performance | 106 | 107 | 108 | 109 | 108 | 109 | 109 | 111 | 112 | 114 | 115 | 116 | 118 |

|  | Comex 3-1 | Comex 3-2 | Comex 3-3 | Comex 3-4 | Comex 3-5 | Comex 3-6 | Comex 3-7 | Comex 3-8 | Comex 3-9 | Comex 3-10 | Comex 3-11 | Comex 3-12 |
|---|---|---|---|---|---|---|---|---|---|---|---|---|
| Coefficient of friction of land portion | 85 | 87 | 90 | 88 | 92 | 93 | 90 | 92 | 89 | 90 | 92 | 86 |

TABLE 3-3-continued

| | | | | | | | | | | | | |
|---|---|---|---|---|---|---|---|---|---|---|---|---|
| On ice and snow performance | 86 | 87 | 89 | 90 | 92 | 92 | 91 | 93 | 90 | 88 | 93 | 88 |

As can be seen from table 2, all of Invention Example Tires 3-1 through 3-25 have larger coefficient of friction and on ice and snow performance than the Conventional Example tire. Thus, all of the Invention Example tires 1-1 through 1-5 may be improved braking and driving performance compared to the Conventional Example tire. Further, because the average coefficient of friction of Comparative Example tires 3-1 and 3-12 was small, it could be confirmed that the braking and driving performance ware especially able to be improved when the main bend point locates in the depth region of not less than D/4 and not more than 3D/4 from the tread surface, and the sipes comprising a bend region in which the bend portion bending across the perpendicular portion toward one side and then toward the other extends toward the longitudinal direction of the sipe, and a plate-like area on either side or both sides of the bend region, in which the perpendicular region is continuous in the longitudinal direction of the sipe. The lacks of sipe edge were found in the Comparative Example tires 3-12.

INDUSTRIAL APPLICABILITY

According to the present invention, it is possible, as for the pneumatic tire with land portion of tread having one or more sipes, to improve braking and driving performance on both icy-snowy road and dry road by suppressing the deformation and leaning of the land portion and increase the grounding property sufficiently. Present invention is particularly preferable to apply for the tire having comparably few sipes, for example, for the all-season tires.

REFERENCE NUMERALS 1 pneumatic tire
2 tread
3 land portion
4 circumferential groove
5 lateral groove
6 sipe
9 straight section
10 perpendicular section
11 bend section
12 first inclined portion
13 second inclined portion
14,15 inclined portion
A orthographic projection area of the sipe
C widthwise center line of the sipe
D depth of sipe
E length of the first inclined section 12
F length of the second inclined section 13
K width of sipe
L length in the longitudinal direction of the sipe
M bend region
N, $N_1$, $N_2$ plate-like area
P main bend point
$Q_1$ first sub bend point
$Q_2$ second sub bend point
S surface of land portion 3
$W_1$ widthwise distance of the sipe of the first inclined portion 12
$W_2$ widthwise distance of the sipe of the second inclined portion 13
H length of perpendicular section 10 from tread surface S in normal direction
X tire width direction
Y tire circumferential direction
Z normal direction from the tread surface S to the bottom of the land portion (tire radial direction)
a1 area of the first inclined section extending in the longitudinal direction of the sipe
a2 area of the second inclined section extending in the longitudinal direction of the sipe

The invention claimed is:

1. A pneumatic tire including a tread with land portions each having one or more sipes, wherein:
the sipe has a depth (D) and comprises, as seen in a widthwise section of the sipe and in a depth direction from the tread surface (S), a perpendicular portion extending along a normal line of the tread surface at a center of an opening of the sipe, and a bend portion bending across the perpendicular portion toward one side and then toward the other;
the bend portion comprises, in an order in the depth direction, a first sub-bend point in a depth region of D/7-D/2, a main-bend point in a depth region of D/4-3D/4, and a second sub-bend point in a depth region of D/2-6D/7, wherein a first inclined section is formed between the first sub-bend point and the main-bend point, and a second inclined section directly connects between the main-bend point and the second sub-bend point;
the first inclined section forms an acute angle θ1 relative to a tangent at an opening end of the sipe in the tread surface, wherein the acute angle θ1 of the first inclined section is 30°≤θ1≤60°, and the second inclined section forms an acute angle θ2 relative to said tangent, wherein the acute angle θ2 of the second inclined section is 30°≤θ2≤60°;
the bend portion further comprises a third inclined section extending continuously from a bottom of the perpendicular portion to the first sub-bend point and inclined toward an opposite direction of an extending direction of the first inclined section relative to the normal direction, and a fourth inclined section extending continuously from the second sub-bend point to an end of the fourth inclined section and inclined toward an opposite direction of an extending direction of the second inclined section relative to the normal direction; and
each area of the first inclined section and the second inclined section is larger than each area of the third inclined section and the fourth inclined section;
wherein each of the areas of the first inclined section, the second inclined section, the third inclined section, and the fourth inclined section is calculated by multiplying a respective extending length thereof and a longitudinal length of the sipe.

2. The pneumatic tire according to claim 1, wherein the first inclined section extends in the tangential direction of the tread surface over a distance ($W_1$), which is 0<$W_1$≤D/3, and the second inclined section extends in the tangential direction of the tread surface over a distance ($W_2$), which is $0<W_2 \leq D/3$.

3. The pneumatic tire according to claim 1, wherein the perpendicular section has a length in the normal direction of the tread surface, said length being not less than (D/7).

4. The pneumatic tire according to claim 1, wherein the longitudinal direction of the sipe is consistent with the tire width direction.

5. The pneumatic tire according to claim 1, wherein the sipes have a sipe density (TL/R) which indicates a ratio of the total value (TL) of the longitudinal length of all the sipes in the tread surface to the total area (R) of the land portion of the tread, said sipe ratio being not more than 0.1/mm.

6. The pneumatic tire according to claim 1, wherein the tread comprises a center region defined between a ½ point of the tread which is a midpoint between the tread ends, and ¼ points of the tread which are midpoint between the ½ point and the tread ends, and shoulder regions defined between the ¼ points and the tread ends, wherein the center region has a sipe density (TLC/RC), which is a ratio of the total value (TLC) of the longitudinal length of all the sipes in the tread surface in the center region to the total area (RC) of the land portion of the tread, said sipe density in the center region being not more than 0.25/mm, and wherein each of the shoulder regions have a sipe density (TLS/RS), which is ratio of total value (TLC) of the longitudinal length of all the sipes in the tread surface of a shoulder region to the total area (RC) of the land portion of the tread, said sipe density in the shoulder regions being not more than 0.2/mm.

7. The pneumatic tire according to claim 1, wherein the sipe comprises a bend region, in which the bend portion is continuous in the longitudinal direction of the sipe, and a plate-like area on either side or both sides of the bend region, in which the perpendicular region is continuous in the longitudinal direction of the sipe.

8. The pneumatic tire according to claim 7, wherein the plate-like region has a length in the longitudinal direction, said length being not less than 1% and not more than 95% of the length of the sipe in the longitudinal direction.

9. A pneumatic tire including a tread with land portions each having one or more sipes, wherein:
the sipe has a depth (D) and comprises, as seen in a widthwise section of the sipe and in a depth direction from the tread surface (S), a perpendicular portion extending along a normal line of the tread surface at a center of an opening of the sipe, and a bend portion bending across the perpendicular portion toward one side and then toward the other;
the bend portion comprises, in an order in the depth direction, a first sub-bend point in a depth region of (D/7-D/2), a main-bend point in a depth region of (D/4-3D/4), and a second sub-bend point in a depth region of (D/2-6D/7), forming a first inclined section directly connecting between the first sub-bend point and the main-bend point, and a second inclined section directly connecting between the main-bend point and the second sub-bend point;
the first inclined section has an area (a1) and a ratio (a1/A) of the area a1 to the projected area (A) of the sipe in an orthogonal projection in the width direction of the sipe, and the second inclined section has an area (a2) and a ratio (a2/A) of the area (a2) to said projected area (A) of the sipe, wherein the ratios (a1/A, a2/A) of the first and second inclined sections are both not less than 0.1;
the bend portion further comprises a third inclined section extending continuously from a bottom of the perpendicular portion to the first sub-bend point and inclined toward an opposite direction of an extending direction of the first inclined section relative to the normal direction, and a fourth inclined section extending continuously from the second sub-bend point to an end of the fourth inclined section and inclined toward an opposite direction of an extending direction of the second inclined section relative to the normal direction; and
each area of the first inclined section and the second inclined section is larger than each area of the third inclined section and the fourth inclined section;
wherein each of the areas of the first inclined section, the second inclined section, the third inclined section, and the fourth inclined section is calculated by multiplying a respective extending length thereof and a longitudinal length of the sipe.

10. The pneumatic tire according to claim 9, wherein both of said ratios (a1/A, a2/A) are not more than 0.5.

11. The pneumatic tire according to claim 9, wherein the first inclined section extends in the tangential direction of the tread surface over a distance ($W_1$), which is $0<W_1 \leq D/3$, and the second inclined section extends in the tangential direction of the tread surface over a distance ($W_2$), which is $0<W_2 \leq D/3$.

12. The pneumatic tire according to claim 9, wherein the perpendicular section has a length in the normal direction of the tread surface, said length being not less than (D/7).

13. The pneumatic tire according to claim 9, wherein the longitudinal direction of the sipe is consistent with the tire width direction.

14. The pneumatic tire according to claim 9, wherein the sipes have a sipe density (TL/R) which indicates a ratio of the total value (TL) of the longitudinal length of all the sipes in the tread surface to the total area (R) of the land portion of the tread, said sipe ratio being not more than 0.1/mm.

15. The pneumatic tire according to claim 9, wherein the tread comprises a center region defined between a ½ point of the tread which is a midpoint between the tread ends, and ¼ points of the tread which are midpoint between the ½ point and the tread ends, and shoulder regions defined between the ¼ points and the tread ends, wherein the center region has a sipe density (TLC/RC), which is a ratio of the total value (TLC) of the longitudinal length of all the sipes in the tread surface in the center region to the total area (RC) of the land portion of the tread, said sipe density in the center region being not more than 0.25/mm, and wherein each of the shoulder regions have a sipe density (TLS/RS), which is ratio of total value (TLC) of the longitudinal length of all the sipes in the tread surface of a shoulder region to the total area (RC) of the land portion of the tread, said sipe density in the shoulder regions being not more than 0.2/mm.

16. The pneumatic tire according to claim 9, wherein the sipe comprises a bend region, in which the bend portion is continuous in the longitudinal direction of the sipe, and a plate-like area on either side or both sides of the bend region, in which the perpendicular region is continuous in the longitudinal direction of the sipe.

17. The pneumatic tire according to claim 9, wherein the plate-like region has a length in the longitudinal direction, said length being not less than 1% and not more than 95% of the length of the sipe in the longitudinal direction.

18. A pneumatic tire including a tread with land portions each having one or more sipes, wherein:
the sipe has a depth (D) and comprises, as seen in a widthwise section of the sipe and in a depth direction from the tread surface (S), a perpendicular portion extending along a normal line of the tread surface at a center of an opening of the sipe, and a bend portion bending across the perpendicular portion toward one side and then toward the other;

the bend portion comprises, in an order in the depth direction, a first sub-bend point in a depth region of D/7-D/2, a main-bend point in a depth region of D/4-3D/4, and a second sub-bend point in a depth region of D/2-6D/7, wherein a first inclined section is formed between the first sub-bend point and the main-bend point, and a second inclined section is formed between the main-bend point and the second sub-bend point; and the first inclined section forms an acute angle θ1 with relative to a tangent at an opening end of the sipe in the tread surface, wherein the acute angle θ1 of the first inclined section is 30°≤θ1≤60°, and the second inclined section forms an acute angle θ2 relative to said tangent, wherein the acute angle θ2 of the second inclined section is 30°≤θ2≤60°;

wherein the tread comprises a center region defined between a ½ point of the tread which is a midpoint between the tread ends, and ¼ points of the tread which are midpoint between the ½ point and the tread ends, and shoulder regions defined between the ¼ points and the tread ends, wherein the center region has a sipe density (TLC/RC), which is a ratio of the total value (TLC) of the longitudinal length of all the sipes in the tread surface in the center region to the total area (RC) of the land portion of the tread, said sipe density in the center region being not more than 0.25/mm, and wherein each of the shoulder regions have a sipe density (TLS/RS), which is ratio of total value (TLC) of the longitudinal length of all the sipes in the tread surface of a shoulder region to the total area (RC) of the land portion of the tread, said sipe density in the shoulder regions being not more than 0.2/mm.

\* \* \* \* \*